United States Patent
Bugenhagen

(10) Patent No.: US 9,571,363 B2
(45) Date of Patent: Feb. 14, 2017

(54) CONTROL GROUPS FOR NETWORK TESTING

(71) Applicant: CenturyLink Intellectual Property LLC, Denver, CO (US)

(72) Inventor: Michael K. Bugenhagen, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 143 days.

(21) Appl. No.: 14/072,879

(22) Filed: Nov. 6, 2013

(65) Prior Publication Data
US 2015/0019713 A1 Jan. 15, 2015

Related U.S. Application Data

(60) Provisional application No. 61/846,439, filed on Jul. 15, 2013, provisional application No. 61/870,395, filed on Aug. 27, 2013.

(51) Int. Cl.
| | |
|---|---|
| *G06F 15/177* | (2006.01) |
| *H04L 12/26* | (2006.01) |
| *G06F 11/30* | (2006.01) |
| *H04L 29/08* | (2006.01) |
| *H04L 12/24* | (2006.01) |

(52) U.S. Cl.
CPC ....... *H04L 43/0811* (2013.01); *G06F 11/3006* (2013.01); *H04L 43/10* (2013.01); *H04L 43/50* (2013.01); *H04L 67/00* (2013.01); *H04L 41/0677* (2013.01); *H04L 43/087* (2013.01); *H04L 43/0835* (2013.01); *H04L 43/0888* (2013.01); *H04L 43/16* (2013.01)

(58) Field of Classification Search
CPC .. H04L 43/0811; H04L 12/26; G06F 11/3006; G06F 11/30
USPC .................. 709/220–245; 717/125; 714/724
See application file for complete search history.

(56) References Cited

U.S. PATENT DOCUMENTS

| | | | |
|---|---|---|---|
| 6,381,635 B1 | 4/2002 | Hoyer | |
| 8,102,770 B2 * | 1/2012 | Morrill et al. | 370/235 |

(Continued)

OTHER PUBLICATIONS

U.S. Appl. No. 14/586,512; Non-Final Rejection dated Oct. 14, 2016; 37 pages.

*Primary Examiner* — David Lazaro
*Assistant Examiner* — Berhanu Shitayewoldetsadi
(74) *Attorney, Agent, or Firm* — Swanson & Bratschun, L.L.C.

(57) ABSTRACT

Novel tools and techniques are provided for testing performance of network connections. In some cases, a method for testing performance of a network connection might comprise establishing a plurality of test points within one or more segments in the network connection. With a computer, performance of a selected segment of the network connection at one or more first test points may be tested. The selected segment might have a first endpoint and a second endpoint. The performance of one or more sub-segments of the selected segment at one or more second test points may also be tested with the computer. The computer may also determine an isolated performance of a particular one of the sub-segments based on the testing. In some instances, the method might further comprise determining, with the computer, that performance of the one or more sub-segments has affected performance of the network connection.

27 Claims, 14 Drawing Sheets

(56) References Cited

U.S. PATENT DOCUMENTS

| | | | |
|---|---|---|---|
| 8,208,385 B1* | 6/2012 | Hansen et al. | 370/242 |
| 8,532,074 B2* | 9/2013 | Navda et al. | 370/338 |
| 2002/0129161 A1* | 9/2002 | Lloyd et al. | 709/238 |
| 2003/0053420 A1 | 3/2003 | Duckett | |
| 2004/0177138 A1 | 9/2004 | Salle | |
| 2005/0262240 A1 | 11/2005 | Drees | |
| 2005/0270982 A1* | 12/2005 | McBeath | H04L 1/205 370/252 |
| 2006/0085420 A1 | 4/2006 | Hwang | |
| 2008/0049645 A1* | 2/2008 | Singh | H04L 41/0853 370/254 |
| 2009/0028062 A1* | 1/2009 | Meloche | G06Q 40/00 370/252 |
| 2009/0138769 A1* | 5/2009 | Lutz et al. | 714/724 |
| 2009/0310485 A1* | 12/2009 | Averi et al. | 370/232 |
| 2009/0327353 A1 | 12/2009 | Zhuge | |
| 2010/0192128 A1* | 7/2010 | Schloegel et al. | 717/125 |
| 2010/0306333 A1 | 12/2010 | Patrawala | |
| 2011/0131321 A1* | 6/2011 | Black et al. | 709/224 |
| 2012/0047251 A1 | 2/2012 | Baumback | |
| 2012/0131466 A1* | 5/2012 | Bugenhagen | 715/733 |
| 2014/0280904 A1* | 9/2014 | Bugenhagen | 709/224 |
| 2015/0309910 A1 | 10/2015 | Cook | |
| 2015/0333985 A1 | 11/2015 | Offer | |

* cited by examiner

OAM Testing:

Throughput/Capacity Testing:

OAM Testing:

Throughput/Capacity Testing:

CONTROL GROUPS FOR NETWORK TESTING

CROSS-REFERENCES TO RELATED APPLICATIONS

This application claims priority to U.S. Patent Application Ser. No. 61/846,439 (the "'439 application"), filed Jul. 15, 2013 by Michael K. Bugenhagen, entitled, "Control Groups for Network Testing."

This application also claims priority to U.S. Patent Application Ser. No. 61/870,395 (the "'395 application"), filed Aug. 27, 2013 by Michael K. Bugenhagen, entitled, "Control Groups for Network Testing."

The entire disclosure of each of these applications is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for testing performance of a network connection.

BACKGROUND

In a cloud environment, or in any computing network, failures or reduced performance along any number of "paths" between a source (e.g., a website server) and a user device can occur due to one or more of a host of events or causes, including, but not limited to, data traffic congestion, faulty hardware or hardware failure, insufficient network connections and/or nodes, electrical surges, natural or man-made disasters, inefficient routing protocols, and/or software glitches, etc.

At present, there are insufficient testing points and servers that accurately monitor segments of interest within computing networks, which might include various networks that are administratively separate from each other (i.e., controlled, operated, and/or maintained by different Internet service providers ("ISPs")). Much of existing testing configurations for monitoring network performance encompass, but do not discount, network performance metrics contributed by segments of the computing network that lie outside of the purview of any particular Internet service provider to control and perform maintenance and repair.

In some cases, technicians may need to be called out to the customer premises and/or service locations at which the ISP's network equipment might be located, in order to monitor and diagnose problems with network connectivity and performance.

In other cases, because of insufficient monitoring of all network connections, even if less congested alternate "paths" exist, it is not possible or practical to easily and effectively identify such alternate "paths" for redirecting or rerouting the data traffic, especially as data congestion factors and effects can change rapidly and unexpectedly.

In sum, any existing networking performance monitoring systems either are inadequate to the task of accurately testing performance (and, in some cases, capacity) of particular segments of interest, are incapable of autonomously or automatically rerouting along higher capacity "paths," are too costly to ensure adequate monitoring, and/or take too long to gather and analyze the appropriate network performance metrics.

Hence, there is a need for more robust and scalable network performance testing solutions.

BRIEF SUMMARY

Various embodiments provide techniques for testing performance of a network connection, and, in some cases, utilizing control groups to test performance of the network connection.

In some cases, to test performance of a network connection, a plurality of test points within one or more segments in the network connection might be established. With a computer, performance of a selected segment of the network connection at one or more first test points may be tested. The selected segment might have a first endpoint and a second endpoint. The performance of one or more sub-segments of the selected segment at one or more second test points may also be tested with the computer. At least one of the one or more sub-segments might serve as a control group during performance analysis. The computer may also determine an isolated performance of a particular one of the sub-segments based on the testing. In some instances, the computer might be used to determine whether performance of the one or more sub-segments has affected performance of the network connection.

In the case that loading a website on a user device might be at issue, testing performance of network connections might include one or more test points identifying poor performance in browsing a website on the Internet from a subscriber device at a subscriber premises. Various segments in the network—including, but not limited to, a segment between the subscriber device and the website ("end-to-end segment"), a segment between the subscriber device and a broadband modem on the subscriber local area network ("LAN"), and/or a segment between the broadband modem and the Internet drain between the Internet service provider ("ISP") network and the Internet, or the like—may be tested for performance and/or capacity. Based on the testing, at least one of the test points (e.g., a test server) might determine a source of the poor performance, which might be at least one of the subscriber LAN, the ISP network, the Internet, or the website.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a method might be provided for testing performance of a network connection. The method might comprise identifying, at a computer, poor performance in browsing a web site on the Internet from a subscriber device at a subscriber premises. The subscriber premises might comprise a subscriber local area network that provides communication between the subscriber device and a provider access network. The provider access network might provide access, through an Internet drain, to the Internet. The method might further comprise testing, with the computer, network performance between the subscriber device and the web site, testing, with the computer, network performance between the subscriber device and a broadband modem on the subscriber local area network, and testing, with the computer, network performance between the broadband modem and the Internet drain. The method might also comprise determining, with the computer, a source of the poor performance, the source of the poor performance being one or more of the subscriber local area network, the provider access network, the Internet, or the web site, based on the testing.

In some cases, the subscriber device might be the computer. In other cases, the computer might be a provider computer in the provider network, in communication with a provider application on the subscriber device.

In another aspect, a method might be provided for testing performance of a network connection comprising one or more segments. The method might comprise establishing a plurality of test points within the one or more segments. The method might also comprise testing, with a computer, performance of a selected segment of the network connection at one or more first test points, the selected segment having a first endpoint and a second endpoint and testing, with the computer, performance of one or more sub-segments of the selected segment of the network connection at one or more second test points. The method might further comprise determining, with the computer, an isolated performance of a particular one of the sub-segments based on the testing.

According to some embodiments, the method might further comprise determining, with the computer, whether performance of the one or more sub-segments has affected performance of the network connection. In some cases, testing performance of the selected segment and the one or more sub-segments might comprise receiving, at the computer, test data from the one or more first test points and the one or more second test points. The one or more first test points and the one or more second test points might each comprise at least one test point in common. In some instances, the computer might be a first computer and at least one of the test points might be a second computer executing a testing application. Alternatively, or additionally, at least one of the test points might be a dedicated testing device and/or a routing element in the network connection.

In some instances, the selected segment might comprise a connection between a subscriber device and a test server on the Internet. The selected segment might comprise a plurality of sub-segments including a first sub-segment from a subscriber device to a provider access device, a second sub-segment from the provider access device to a provider Internet drain, and a third sub-segment from the provider Internet drain to the test server on the Internet. Testing one or more sub-segments, in some cases, might comprise testing a consolidated sub-segment comprising the second and third sub-segments. In such a case, the method might further comprise determining whether performance of the first sub-segment has affected performance of the network connection, based at least in part on testing of the selected segment and testing of the consolidated sub-segment. In some embodiments, the provider access device might be a broadband modem at a subscriber premises.

According to some embodiments, testing performance of the selected segment might comprise testing performance of the segment on a first interval, while testing performance of the one or more sub-segments might comprise testing performance of the one or more sub-segments on a second interval. In some cases, the first interval might be at least eight times the second interval. Testing performance of the selected segment might comprise operations, administration, and maintenance ("OAM") testing, which might, in some instances, allow testing of the selected segment and testing of the one or more sub-segments to be performed simultaneously. Alternatively, or in addition, testing performance of the selected segment might comprise throughput testing or capacity testing, in which case testing the selected segment and testing the one or more sub-segments might, in some embodiments, be performed sequentially.

The method, in some instances, might further comprise tracking, with a testing system, performance of the selected segment over time. In some cases, the method might comprise generating, with the testing system, a test report comprising a field identifying whether the test report pertains to the selected segment or one or more of the sub-segments.

In yet another aspect, an apparatus might be provided. The apparatus might comprise a non-transitory computer readable medium having encoded thereon a set of instructions that, when executed by one or more computers, causes the apparatus to perform one or more operations for testing performance of a selected segment of network connection. The selected segment of network connection might comprise a plurality of segments and might have a plurality of test points within the one or more segments. The set of instructions might comprise instructions to test performance of a selected segment of the network connection at one or more first test points. The selected segment might have a first endpoint and a second endpoint. The set of instructions might also comprise instructions to test performance of one or more sub-segments of the selected segment of the network connection at one or more second test points. The set of instructions might further comprise instructions to determine an isolated performance of a particular one of the sub-segments based on the testing.

In still another aspect, a computer system might be provided. The computer system might comprise one or more processors and a non-transitory computer readable medium in communication with the one or more processors. The computer readable medium might have encoded thereon a set of instructions that, when executed by the one or more processors, causes the computer system to perform one or more operations for testing performance of a selected segment of network connection. The selected segment of network connection might comprise a plurality of segments and might have a plurality of test points within the one or more segments. The set of instructions might comprise instructions to test performance of a selected segment of the network connection at one or more first test points. The selected segment might have a first endpoint and a second endpoint. The set of instructions might also comprise instructions to test performance of one or more sub-segments of the selected segment of the network connection at one or more second test points. The set of instructions might further comprise instructions to determine an isolated performance of a particular one of the sub-segments based on the testing.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
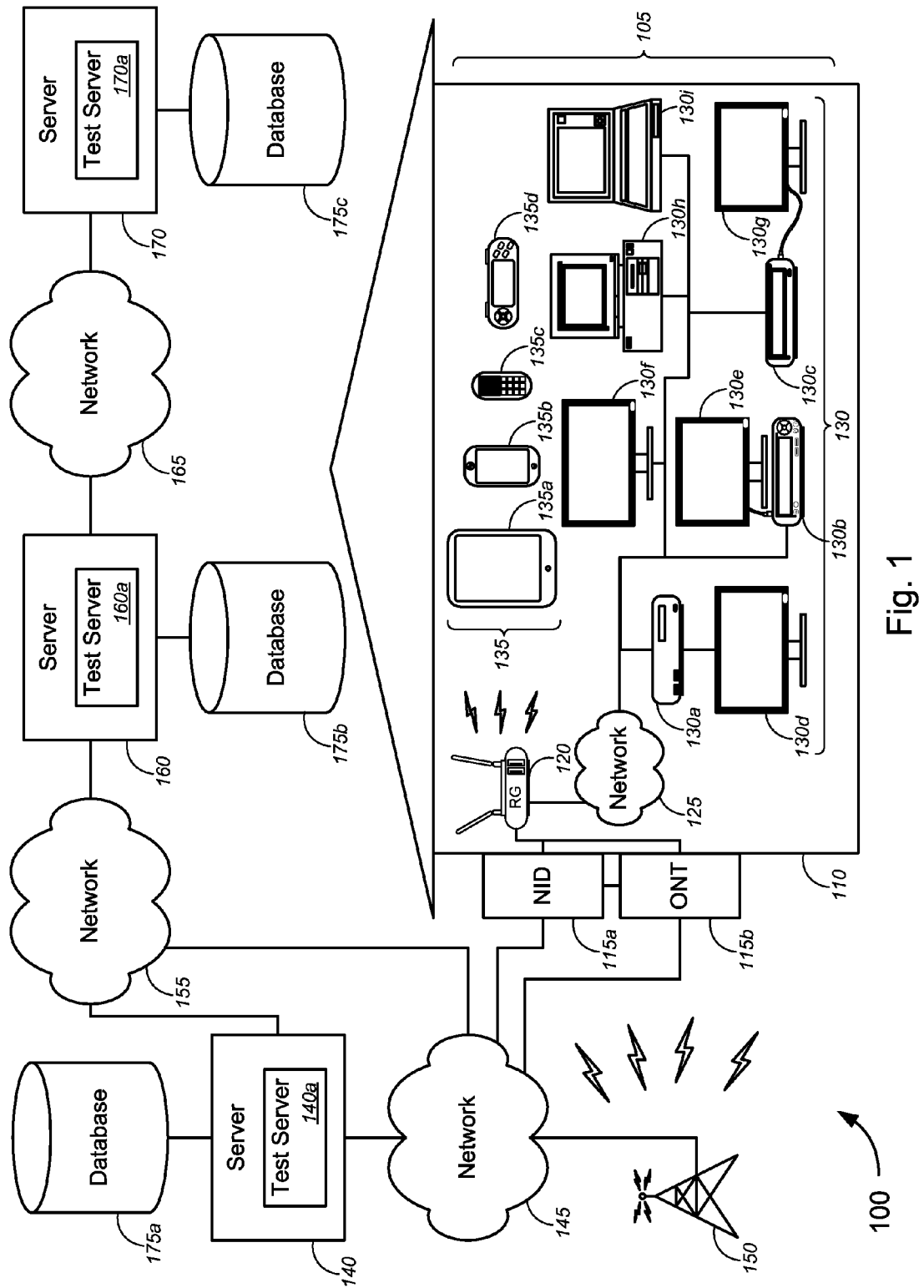
FIG. 1 is a general schematic diagram illustrating a system for testing performance of a network connection, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for testing performance of a network connection, and, in some cases, utilizing control groups to test performance of the network connection.

In some cases, to test performance of a network connection, a plurality of test points within one or more segments in the network connection might be established. With a computer, performance of a selected segment of the network connection at one or more first test points may be tested. The selected segment might have a first endpoint and a second endpoint. The performance of one or more sub-segments of the selected segment at one or more second test points may also be tested with the computer. At least one of the one or more sub-segments might serve as a control group during performance analysis. The computer may also determine an isolated performance of a particular one of the sub-segments based on the testing. In some instances, the computer might be used to determine whether performance of the one or more sub-segments has affected performance of the network connection.

In some instances, the selected segment might include a connection between a subscriber device and a test server on the Internet. The selected segment might include a plurality of sub-segments including (without limitation) a first sub-segment from a subscriber device to a provider access device, a second sub-segment from the provider access device to a provider Internet drain, and a third sub-segment from the provider Internet drain to the test server on the Internet. In such a case, testing one or more sub-segments might include testing a consolidated sub-segment having the second and third sub-segments. It may then be determined whether performance of the first sub-segment has affected performance of the network connection, based at least in part on testing of the selected segment and testing of the consolidated sub-segment.

In the case that loading a website on a user device might be at issue, testing performance of network connections might include one or more test points identifying poor performance in browsing a website on the Internet from a subscriber device at a subscriber premises. Various segments in the network—including, but not limited to, a segment between the subscriber device and the website ("end-to-end segment"), a segment between the subscriber device and a broadband modem on the subscriber local area network ("LAN"), and/or a segment between the broadband modem and the Internet drain between the Internet service provider ("ISP") network and the Internet, or the like—may be tested for performance and/or capacity. Based on the testing, at least one of the test points (e.g., a test server) might determine a source of the poor performance, which might be at least one of the subscriber LAN, the ISP network, the Internet, or the website.

In the case a customer network might be at issue, testing performance of network connections might include one or more test points identifying poor performance in the customer network at the subscriber premises. Various segments in the network—including, but not limited to, a segment between the subscriber device and the test server in the Internet or "off-net" ("end-to-end segment"), a segment between a broadband modem on the subscriber local area network ("LAN") and the Internet drain between the Internet service provider ("ISP") network and the Internet, and/or a segment between the Internet drain and the test server, or the like—may be tested for performance and/or capacity. Based on the testing, at least one of the test points (e.g., a test server) might determine a source of the poor performance, which might be at least one of the subscriber LAN, the ISP network, or the Internet.

In either case, operations, administration, and maintenance ("OAM") testing and/or throughput or capacity testing may be implemented, in order to test performance (including, but not limited to, frame loss, frame delay, frame delay range, jitter, etc.) and capacity of the network components, respectively. Except for testing jitter, OAM testing may be performed on two or more segments concurrently or simultaneously. Throughput or capacity testing of different segments, on the other hand, must be performed separately; to improve accuracy, sequential testing may be implemented.

Herein, "network interface device" or "NID" might refer to a gateway device that connects the interior or internal data network within the customer premises with the exterior or external data network outside the customer premises (i.e., the network owned and/or operated by a service provider).

According to some embodiments, an "off-network" or "off-net" server might refer to a server that is not typically linked to other servers in the network and/or that does not typically exchange data packets with other servers in the network in a similar manner as these other servers. An "off-network" server may be operated by another Organization, and is therefore not under the control of the originating test organization. The "off-network" or "off-net" server might, in some cases, mainly receive information (e.g., status information, configuration information, and/or other suitable information, etc.) from the servers or other network devices in the network to monitor performance of the network connections; information sent from the "off-network" or "off-net" server might include, without limitation, pings, queries, prompts, or other suitable inquiries, or the like. In some instances, the "off-network" or "off-net" server might be a server that connects itself to the network (i.e., by communicatively linking to one or more servers in the network) when performing system monitoring of network connection performance, but would otherwise be configured to disconnect itself from the network (i.e., to break the link with all other servers in the network, to remain "off-net").

The term "peering point" or "exchange point" might refer to a voluntary interconnection of separate networks for the purpose of exchanging data traffic between users of each network. Each separate network might be established, administrated, operated, and/or maintained by separate entities (e.g., separate service providers). The exchange of data traffic is typically governed by a contract or agreement (whether oral or written) between two such entities or among a group of entities, and can include a free exchange or a fee-based (or other compensation-based) exchange. In other words, the peering might involve interconnecting two networks ("bilateral peering"), or interconnecting three or more networks ("multilateral peering"). The largest Internet exchange points, for example, can interconnect hundreds of separate networks. Such interconnections amongst separate networks might be governed by exchange of routing information through a border gateway protocol ("BGP") routing protocol or the like.

Herein also, the term "Internet drain" might refer to a point defining a boundary between an edge (e.g., router, switch, server, etc.) of an Internet service provider network and an edge (e.g., router, switch, server, etc.) of other networks. Internet drains are typically found in some major cities.

The terms "One-Way Active Measurement Protocol" ("OWAMP") and "Two-Way Active Measurement Protocol" ("TWAMP") might refer to open protocols for measurement of network metrics. As the names suggest, OWAMP is a protocol for measuring one-way metrics between network devices, while TWAMP is a protocol for measure two-way (or round-trip) metrics between two network elements. OWAMP is described in detail in Internet Engineering Task Force ("IETF") Network Working Group Request for Comments ("RFC") 4656, while TWAMP is described in detail in IETF RFC 5357, the contents of both of which are hereby incorporated by reference in their entirety.

We now turn to the embodiments as illustrated by the drawings. FIGS. 1-10 illustrate some of the features of the method, system, and apparatus for testing performance of a network connection, as referred to above. The methods, systems, and apparatuses illustrated by FIGS. 1-10 refer to examples of different embodiments that include various components and steps, which can be considered alternatives or which can be used in conjunction with one another in the various embodiments. The description of the illustrated methods, systems, and apparatuses shown in FIGS. 1-10 is provided for purposes of illustration and should not be considered to limit the scope of the different embodiments.

With reference to the figures, FIG. 1 is a general schematic diagram illustrating a system 100 for testing performance of a network connection, in accordance with various embodiments. In FIG. 1, system 100 might comprise one or more customer premises equipment ("CPE") 105 located in or at customer premises 110. The one or more CPE 105 might comprise a network interface device ("NID") 115a, an optical network terminal ("ONT") 115b, a modem or residential gateway ("RG") 120, and/or one or more user devices 130. The one or more user devices 130 might comprise gaming console 130a, digital video recording and playback device ("DVR") 130b, set-top or set-back box ("STB") 130c, one or more television sets ("TVs") 130d-130g, desktop computer 130h, laptop computer 130i, and/or one or more mobile user devices 135. The one or more TVs 130d-130g might include any combination of a high-definition ("HD") television, an Internet Protocol television ("IPTV"), and/or a cable television, or the like, where one or both of HDTV and IPTV (if present in system 100) may be interactive TVs. The one or more mobile user devices 135 might comprise one or more tablet computers 135a, one or more smart phones 135b, one or more mobile phones 135c, and/or one or more portable gaming devices 135d, or the like. The RG 120 and the one or more user devices 130 might communicatively couple to each other, via either wired or wireless connection, to establish a subscriber local area network ("LAN") 125 within customer premises 110.

System 100 might further comprise a first server 140 communicatively coupled to one or more CPEs 105 via network 145 (which might include, but is not limited to, an access network, a service provider network, a wide area network ("WAN"), or other suitable network, and the like), and in some cases via one or more telecommunications relay systems 150. The one or more telecommunications relay systems 150 might include, without limitation, one or more wireless network interfaces (e.g., wireless modems, wireless access points, and the like, one or more towers, one or more satellites, and the like). System 100 might further comprise network 155 (which might include, but is not limited to, a wide area network ("WAN"), the Internet, or other suitable network, and the like) and server 160 communicatively coupled to network 155. In some instances, system 100 might also comprise network 165 (which might include, without limitation, a wide area network ("WAN"), a tester network, or other suitable network, and the like) and server 170 communicatively coupled to network 165. In some cases, server 170 might be part of the Internet, while, in other cases, server 170 might be configured so as to be considered "off-net" (a description of which is provided above).

System 100 might further comprise one or more databases 175. The one or more databases 175 might include a database 175a local to the server 140, a database 175b local to server 160, and/or a database 175c local to server 175c. In some embodiments, server 140—with database 175a communicatively coupled thereto—might be communicatively coupled directly to only network 145, and indirectly to network 155 via network 145. In other instances, server 140 might be communicatively coupled directly to both networks 145 and 155. According to some embodiments, system 100 might further comprise one or more test servers 140, which might include test server 140a, test server 160a, and test server 170a. In some instances, test server 140a might be embodied within server 140, while, in other cases, test server 140a might be embodied as a server separate from server 140 that is communicatively coupled to server 140. Likewise test servers 160a and 170a might be embodied within servers 160 and 170, respectively, or embodied as servers separate from servers 160 and 170, respectively, yet communicatively coupled to the respective servers 160 and 170. In some embodiments, test servers 140a, 160a, and/or 170a might represent, and/or might comprise, test points in the network. Test points might include, without limitation, computers, software, and/or hardware that run the tests and/or provide results to an agent or software that derives the performance of the segment of network that is of interest ("segment of interest"). In some embodiments, rather than a server-based test point, at least one of the test servers 140a, 160a, and/or 170a might represent, and/or might comprise, non-server test points that are, instead, embodied in non-server network equipment including, but not limited to, routers, switches, and/or database, or the like. The one or more CPEs 105, in some cases, might also represent, and/or might comprise, test points in the network.

In operation, any segment of system 100 may be tested by one or more test points (which might be embodied in, or might be included in, without limitation, test servers 140a, 160a, and/or 170a and/or one or more CPEs 105) to monitor performance of the subject segment(s), network connections associated with the subject segment(s), or both. Some examples of such monitoring is shown and described below with respect to FIGS. 2-8.

Figure 2:
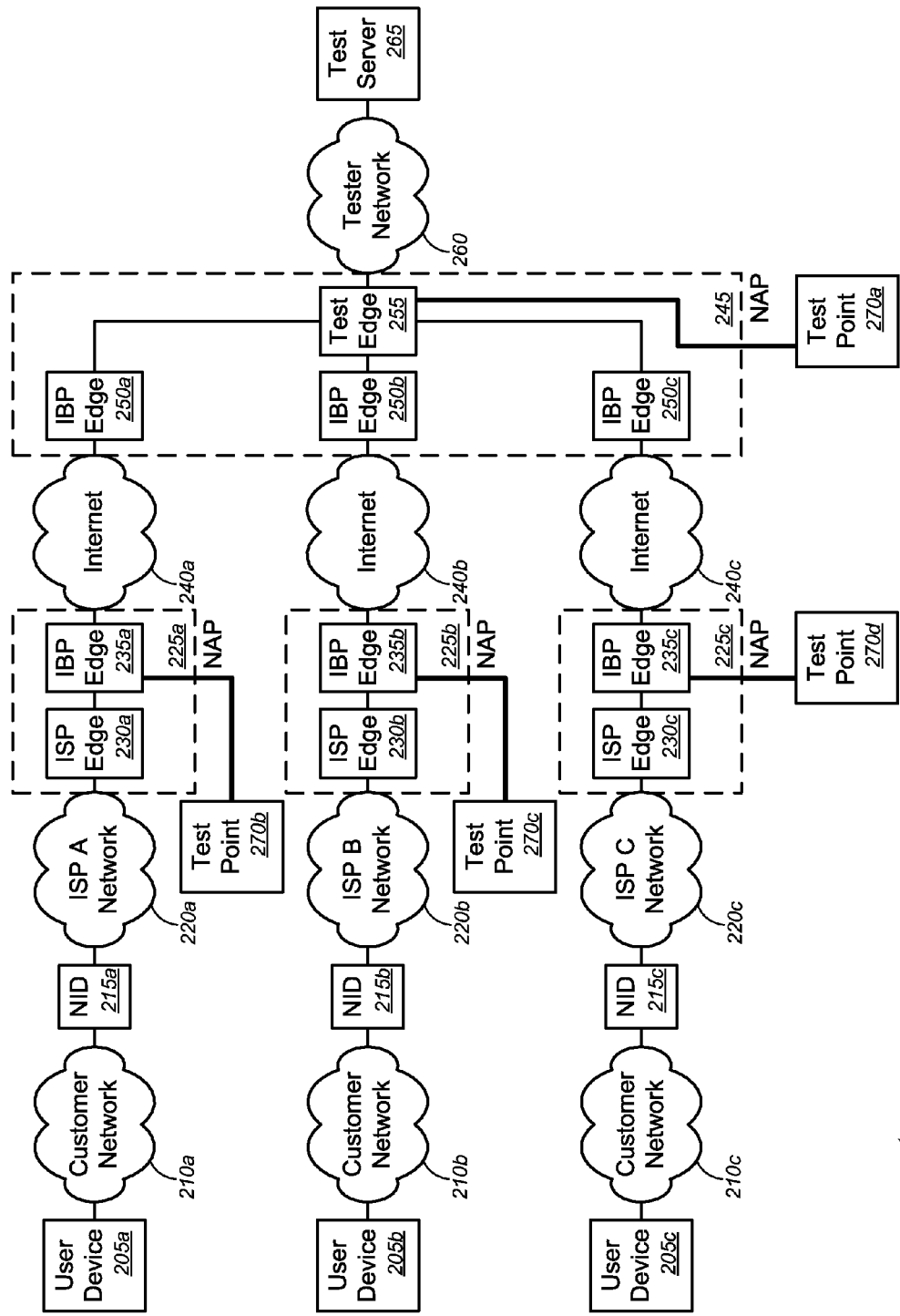
FIG. 2 is a block diagram illustrating a system for testing performance of a network connection, in accordance with various embodiments.
Figure 3:
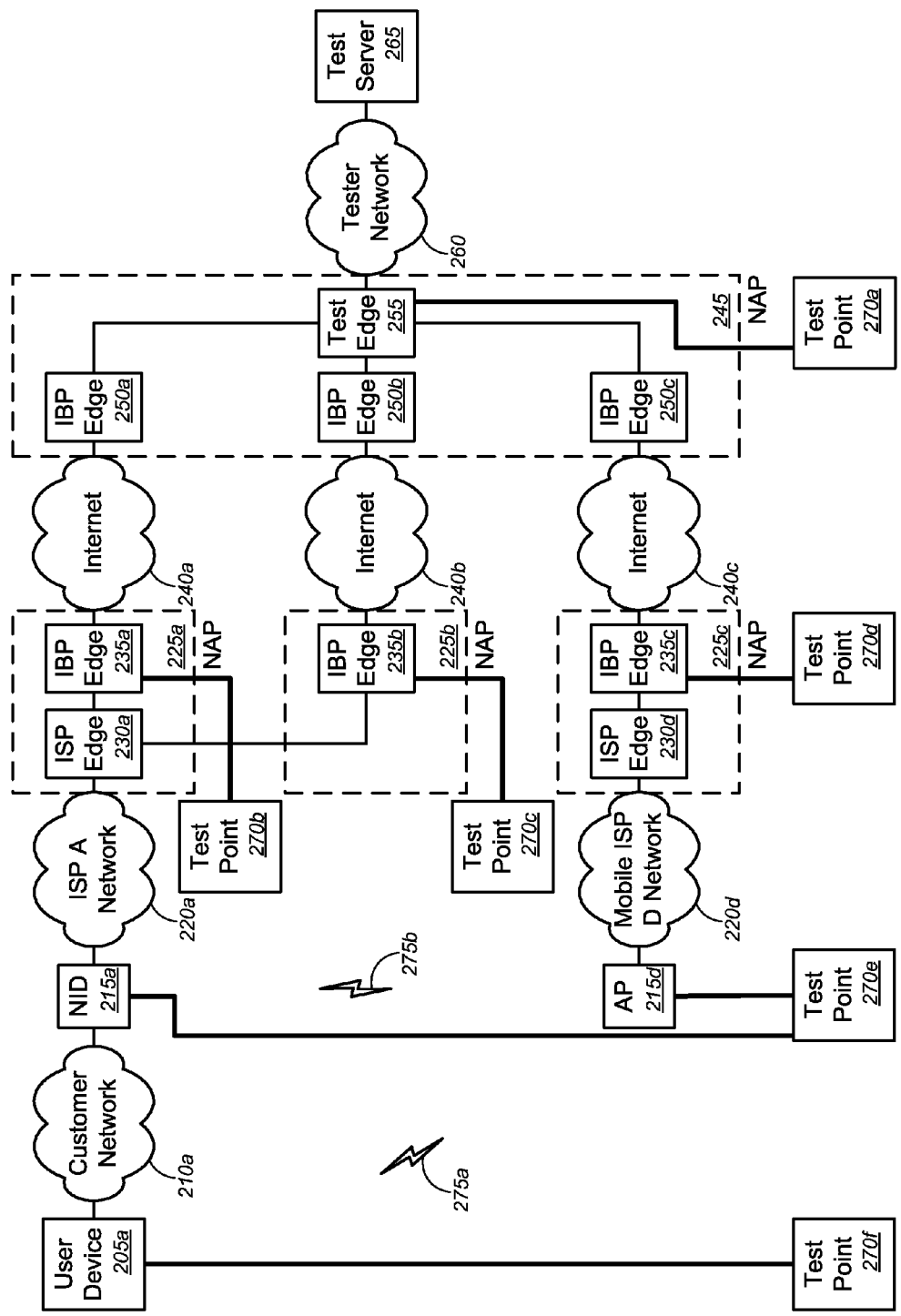
FIG. 3 is a block diagram illustrating another system for testing performance of a network connection, in accordance with various embodiments.

For example, FIGS. 2 and 3 illustrate two non-limiting examples of the use of one or more test points located in various portions or segments of a system (e.g., system 100) or a network system, the one or more test points being configured to monitor performance of network connections in the network system. FIG. 2 is a block diagram illustrating a system 200 for testing performance of a network connection, in accordance with various embodiments. FIG. 3 is a block diagram illustrating another system 300 for testing performance of a network connection, in accordance with various embodiments.

In FIG. 2, system 200 might comprise one or more user devices 205, one or more customer networks 210, one or more network interface devices ("NIDs") 215, one or more provider networks 220, one or more networks 240, one or more first network access points ("NAPs") 225 connecting each provider network 220 to each corresponding network 240, a tester network 260, a second NAP 245 connecting the one or more networks 240 to the tester network 260, and/or a test server 265. The one or more user devices 205 might include, without limitation, one or more of a gaming console, a digital video recording and playback device ("DVR"), a set-top or set-back box ("STB"), a high-definition ("HD") television, an Internet Protocol television ("IPTV"), a cable television, a desktop computer, a laptop computer, a tablet computer, a smart phone, a mobile phones, a portable gaming device, a modem or residential gateway ("RG"), a network interface device ("NID"), and/or an optical network terminal ("ONT").

According to some embodiments, such as shown in FIG. 2, the one or more user devices 205 might include a first user device 205a, a second user device 205b, and a third user device 205c. The one or more customer networks 210 might include a first customer network 210a, a second customer network 210b, and a third customer network 210c. The one or more NIDs 215 might include a first NID 215a, a second NID 215b, and a third NID 215c. Each of the first user device 205a, the first customer network 210a, and the first NID 215a might be associated with a first customer, while each of the second user device 205a, the second customer network 210a, and the second NID 215a might be associated with a second customer, and the third user device 205a, the third customer network 210a, and the third NID 215a might be associated with a third customer.

In the non-limiting example of FIG. 2, the one or more provider networks 220 comprise a first Internet service provider ("ISP") network 220a, a second ISP network 220b, and a third ISP network 220c that are associated with ISP A, ISP B, and ISP C, respectively. The one or more networks 240 might represent one or more portions of the Internet. For example, a first portion 240a might include network components (e.g., servers, routers, switches, databases, etc.) provided by a first Internet backbone provider ("IBP"), while a second portion 240b and a third portion 240c might include corresponding network components respectively provided by a second IBP and a third IBP. In some cases, each network portion 240a through 240c might be provided by a single IBP, thus constituting a single network. In any event, the first through third portions 240a-240c will herein be collectively referred to as the Internet or Internet backbone.

In the embodiment of FIG. 2, the one or more first NAPs 225 includes NAP 225a, NAP 225b, and NAP 225c, which might be associated with the first ISP network 220a, the second ISP network 220b, and the third ISP network 220c, respectively. NAP 225a might include, without limitation, an ISP edge router 230a and an IBP edge router 235a that communicatively couple via what is commonly referred to as a "peering point" (as described above). Likewise, NAP 225b might include an ISP edge router 230b and an IBP edge router 235b communicatively coupled via a peering point. Similarly, NAP 225c might include an ISP edge router 230c and an IBP edge router 235c communicatively coupled via a peering point. The ISP edge routers 230a-230c might be part of the respective ISP networks 220a-220c, while the IBP edge routers 235a-235c might be part of the networks 240a-240c, respectively. The second NAP 245 might include, without limitation, IBP edge routers 250a-250c, which are respectively associated with (and part of) networks 240a-240c. The second NAP 245 might, in some cases, also include a test edge router 255, which might be associated with (or part of) tester network 260. In some cases, the second NAP 245 might be embodied at a data center service location, which might be associated with one of the service providers associated with ISP networks 220 or associated with a group (or conglomeration, association, or the like, etc.) of two or more of these service providers. In other cases, the data center service location might be associated with a third party service provider separate from any of the service providers associated with ISP networks 220.

Although three sets of ISP networks and corresponding customers (and customer devices and customer networks) are shown in FIG. 2, the various embodiments are not so limited, and any suitable number of sets of ISP networks and corresponding customers (and customer devices and customer networks) may be used, depending upon the number of service providers in any particular region (which could include any sized community including, without limitation, a village, a town, a city, a state or province, a nation, a transnational entity, or the like). Although one customer (and customer device and customer network) is shown per set, the various embodiments allow application of the methods described herein to any suitable number of customers (and customer devices and customer networks) ranging from 1 to N, where N is any appropriate number of customers that any service provider can technically connect to the service provider's network. In some cases, any theoretical maximum limit for N may increase with time as technology advances.

In operation, when testing across one or more Internet backbones, the resultant test results of the network connections might reflect performance that is not part of any ISP under test. For example, in a test of the performance of network connections in ISP A network 220a, any network performance issues or problems with IBP network 240a might adversely, and/or inaccurately, affect the test results. In such cases, the segment of interest is the ISP A network 220a (and some cases, the customer network 210a, as well), while the IBP network 240a is deemed less important because it lies outside of the control (and ability to repair) of ISP A, which has a vested interest in repairing any issues with its network and improving performance for its customers.

To address this point, system 200 might further comprise one or more test points 270 (in some cases, at least two test points) that are placed at the edge of peering points, and configured to continually conduct performance tests to reasonably ensure that the IBP and test environments are not impaired. In the example of FIG. 2, a first test point 270a is placed at the edge of NAP 245 (i.e., in communication with test edge router 255), while a second test point 270b is placed at the edge of NAP 225a. A test of ISP A network 220a with an end-to-end test of a segment from user device 205a to test server 265 can properly take into account any performance changes between test points 270a and 270b. Ideally, the desired "path" for such a testing system would call for a lossless or perfect transmission between the test server 265 and the peering point in NAP 225a. Such an ideal desire is impractical. The test points 270a and 270b would allow for a control group test that achieves the purpose of the ideal "path" while recognizing the impracticalities of such an ideal "path," but tracking and discounting from the end-to-end test results any effects caused by the IBP 240a. What remains would include the segment from the user device 205a to the peering point in NAP 225a. To measure the performance of ISP A network 220a, the sub-segment between user device 205a and NID 215a must be tested. In some cases, this can be accomplished by using test points (i.e., a computer, software, and/or hardware) incorporated in each of user device 205a and NID 215a that are configured to monitor performance of network connections, and subtracting this measurement as well as subtracting the "control group test result" (and, in some cases, the test results between test point 270a and test server 265) from the end-to-end result. In the case that the customer network 210a is the segment of interest, test results between NID 215a and test server 265 may be subtracted from the end-to-end result. Likewise, any sub-segment of the ISP B network or the ISP C network can be monitored and tracked in a similar manner using test points 270c and 270d, respectively (and, in some cases, test points in user devices 205b, 205c and NIDs 215b, 215c).

According to some embodiments, the control group test points may be any level or type of testing/monitoring function. For example, the control group test point may simply be a reflector that bounces what is sent to it back to a test point such as a loopback or echo (not unlike in a TWAMP test or the like). The control group test point may also track utilization statistics as to peering points, links, and/or connectivity points, thereby enabling determination of whether a utilization threshold exists. In some cases, the control group test point may also communicate any existence of a utilization threshold (if present). In some embodiments, the control group test point might store network performance analytics, and might send such data to collectors throughout the network.

We now turn to FIG. 3, which shows a system 300 that is similar to system 200. In the example of FIG. 3, system 300 differs from system 200 in that only the ISP A network segments are of interest, with the ISP B and ISP C network segments withdrawn from consideration. However, IBP networks 240b and 240c, as well as the corresponding IBP edges 235b and 235c, remain. In FIG. 3, the ISP A network 220a is communicatively coupled to both IBP networks 240a and 240b via connections between ISP edge router 230a and IBP edge router 235a and between ISP edge router 230a and IBP edge router 235b via corresponding peering points. Meanwhile, IBP network 240c might couple with a mobile ISP D network 220d via ISP edge router 230d that is associated with (and/or is a part of) mobile ISP D network 220*d* and via IBP edge router 235*c*, with ISP edge router 230*d* and IBP edge router 235*c* coupling via a peering point in NAP 225*c*. System 300 might further comprise access point 215*d* that is communicatively linked to mobile ISP D network 220*d*, and that includes a wireless transceiver that allows for wireless communication between AP 215*d* and one or both of user device 205*a* and NID 215*a*, as shown, e.g., via wireless links 275*a* and 275*b*, respectively.

During operation, cloud service providers might want to know the path application suitability so that they can offer services to the customer(s) that will work in an automatic and dynamic way. This requires knowledge of path bandwidth and health. To that end, a plurality of test points might be provided to continually monitor the path bandwidth and health of all applicable paths. In the non-limiting example of FIG. 3, this means that system 300 might further comprise test points 270*e* and 270*f* that are communicatively coupled to and/or configured to monitor access point 215*d*, NID 215*a*, and user device 205*a*. In some cases, test point 270*e* might be embodied as two separate test points, one monitoring NID 215*a*, while the other monitors access point 215*d*. In various examples, test point 270*f* might be embodied with one or more user devices 205*a*, while test point 270*e* might include separate test points each embodied in one of NID 215*a* and/or access point 215*d*. By monitoring all or most sub-segments—including, without limitation, the segment between test server 265 and test point 270*a*, the segments between test point 270*a* and each of test points 270*b*-270*c*, the segment between test point 270*e* and one or both of test points 270*b*-270*c*, the segment between test points 270*d* and 270*e*, and/or the segment between test points 270*e* and 270*f*—the system can determine on a periodic basis, or on a real-time basis, segments having low performance and high performance. With this information, the system can divert the data traffic (e.g., on a real-time and automatic basis) along the high performance segments, while by-passing the low performance segments. For example, if it is determined that test results are abnormally low between test point 270*e* and one or both of test points 270*b* and 270*c* (especially as compared with test results between test point 270*e* and 270*d*, and adjacent segments), which might indicate a problem with ISP A network 220*a* (and also indicating higher relative performance with mobile ISP D network 220*d*), the system can automatically and in real-time divert data traffic through mobile ISP D network 220*d*, and eventually over wireless links 275*a* and/or 275*b*.

According to some embodiments, a 3 graphical user interface ("GUI") method/4 zone approach might be implemented. Contextually, such a framework might provide both capacity information and performance information. These two attributes can easily be represented with color and scale in one or more of three methods: (1) as a network page (with network stored information/controller view); (2) as an application view (at least of the home network); and/or (3) as a hybrid of both (1) and (2) via a GUI or application.

It should be recognized that both short term and long term performance summarizations can be derived for presentation to the customer, and that coupling these performance summarizations with utilization information may be possible. However, as this is a probe state machine, such use may require addition of path monitoring.

Figure 4A:
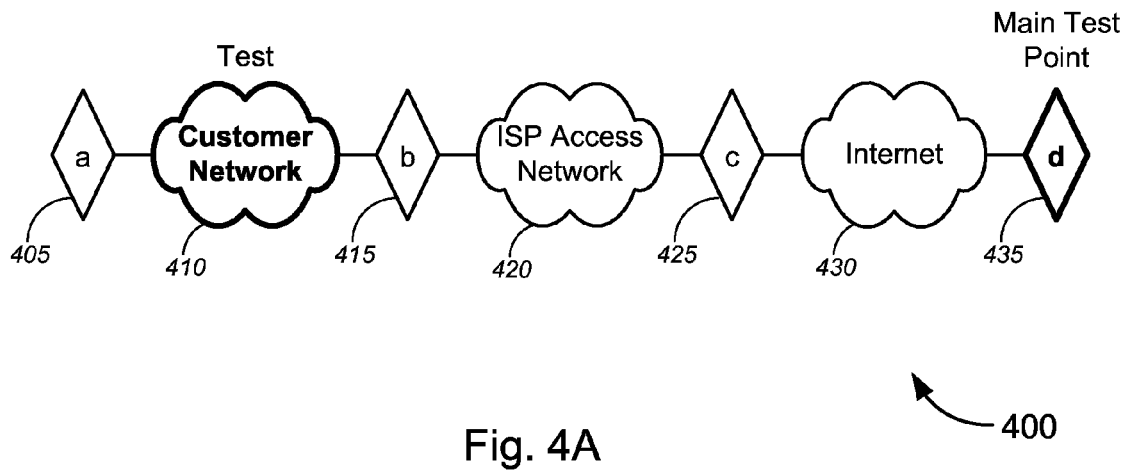
FIGS. 4A-4C are general schematic diagrams illustrating a system and testing schemes for testing performance of a customer network, in accordance with various embodiments.
Figure 4B:
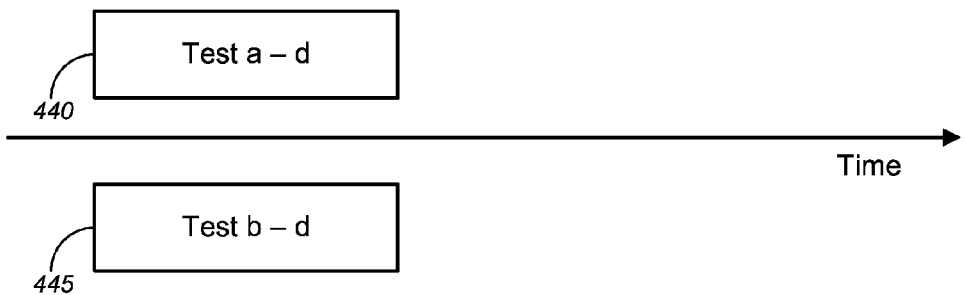
Figure 4C:
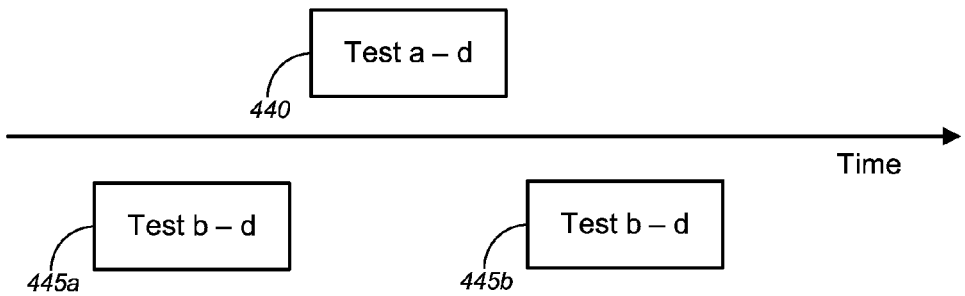
Figure 4D:
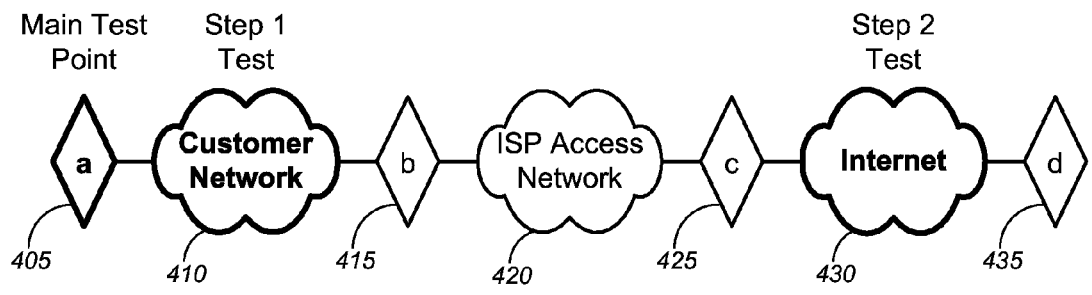
FIGS. 4D-4F are general schematic diagrams illustrating a system and testing schemes for testing performance of network connections for accessing a website, in accordance with various embodiments.
Figure 4E:
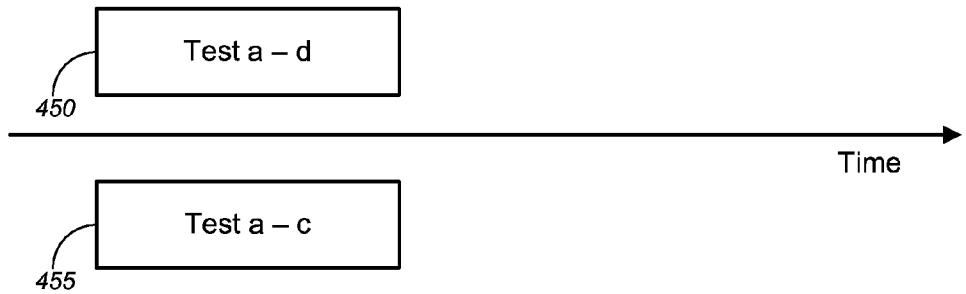
Figure 4F:
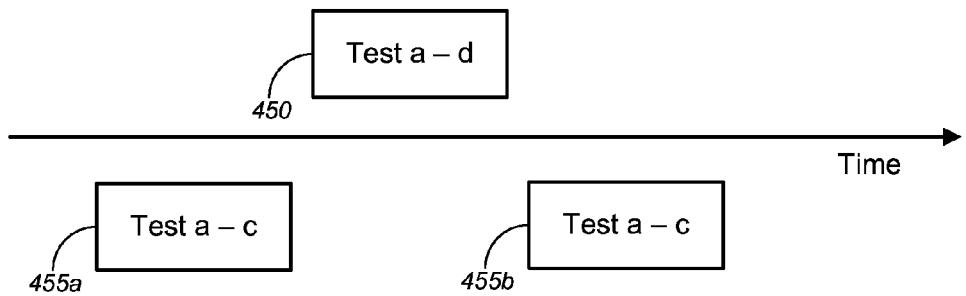

FIGS. 4A-4F (collectively, "FIG. 4") illustrate systems and testing schemes for testing performance of networks or network connections. In particular, FIGS. 4A-4C are general schematic diagrams illustrating a system and testing schemes for testing performance of a customer network, in accordance with various embodiments. FIGS. 4D-4F are general schematic diagrams illustrating a system and testing schemes for testing performance of network connections for accessing a website, in accordance with various embodiments. In the non-limiting example of FIG. 4, system 400 comprises test point a 405, a customer network 410, test point b 415, an ISP access network 420, test point c 425, the Internet (or Internet backbone) 430, and test point d 435. In some cases, test point a 405 might be a user device, which might include one of a gaming console, a DVR, an STB, an HDTV, an IPTV, a cable television, a desktop computer, a laptop computer, a tablet computer, a smart phone, a mobile phone, and/or a portable gaming device, or the like. Test point b 415 might include at least one of an ISP digital subscriber line ("DSL") modem, an ISP cable modem, an RG, a NID, and/or an ONT, or the like. Test point c 425 might include an ISP test point or other suitable test point located at the Internet drain (which is described above). Test point d 435 might refer to a test server or a website. The test server, in some cases, might be located within the Internet, while, in other cases, might be located "off-net."

With reference to FIGS. 4A-4C, in an example in which one wishes to track performance on a customer network 410 using a test server located at test point d 435, the test server might be configured to test two segments of the system, either concurrently or sequentially, depending upon whether capacity testing is involved. One segment might be a control group, which might test the performance between test points b and d ("b to d test segment"). The other segment might be an end-to-end segment, which might test the performance between test points a and d ("end-to-end segment").

Two types of tests (or testing schemes) may be performed: an operations, administration, and maintenance ("OAM") test and a throughput or capacity test. An OAM test, sometimes referred to as "non-capacity testing," might involve testing of two (or more) segments of the system concurrently, e.g., to monitor frame loss ratio, frame delay, frame delay variation, or the like. Given that frame loss and frame delay are additive, synthetic frame loss testing can be conducted simultaneously without interfering with each other. As such, both tests can be run at the same time to provide higher accuracy. Frame delay range or variation can also be measured using similar methodology. Jitter, however, is not additive, and must be tested at a different time (including, but not limited to, testing sequentially with respect to testing of frame loss ratio, frame delay, frame delay variation). In a throughput or capacity test, because testing capacity along one segment can interfere with a similar test along another segment, these tests must be conducted at different times. Sequential testing allows for avoiding such interference, while allowing for accuracy (testing of segments closer in time). To further improve accuracy, two control group tests may be implemented, one before and the other after testing the segment of interest (as shown, e.g., in FIG. 4C).

FIGS. 4B and 4C show the two testing schemes. Turning back to the example of testing the customer network 405 using a test server at test point d 435, FIG. 4B shows an OAM testing scheme, in which an end-to-end test 440 (i.e., a to d segment) is tested concurrently with a control group test 445 (i.e., b to d segment, in this example). FIG. 4C shows a throughput or capacity testing scheme, in which the end-to-end test 440 is staggered with a control group test 445*a*. To improve accuracy, a second control group test 445*b* may be implemented. In this case, the first control group test 445*a* (of the b to d segment, in this example) precedes the end-to-end test 440, which is followed by the second control group test 445*b* (also of the b to d segment, in this example).

With reference to FIGS. 4D-4F, in an example in which a customer has trouble loading a webpage of a website located at test point d 435, an application running on the user device at test point a 405 might determine that a problem exists because performance is bad, but might not have identified the location of the problem.

To locate the fault, a two-step test might be implemented. In the first step, the application might run a test from the user device at test point a 405 to an ISP modem at test point b 415, in order to resolve whether the problem exists with the customer network 410, or with the ISP network 420 or Internet 430 segments. Results of the first step should reflect the capacity and performance on the customer network 410, which might be, in some cases, a Wi-Fi network. In some cases, a test of the a to b segment for both performance (e.g., frame loss, frame delay, bandwidth, etc.) and capacity may be implemented, by comparing performance and capacity at test points a and b. If the test shows minimal loss (i.e., loss within acceptable thresholds) or no loss, then it may be determined that the problem is not located in the customer network 410, but rather in one of the ISP network 420 or the Internet 430, and the process continues with the second step. On the other hand, if the first test shows significant loss (i.e., loss exceeding the acceptable thresholds), then it may be determined that the fault is located at the customer network 410, and the entire two-step test can end here until the fault in the customer network 410 can be repaired. After repairing the fault in the customer network 410, the two-step test can begin again, to determine whether all faults in the customer network 410 have been fixed (step 1), and to determine whether any additional faults are located in either the ISP access network 420 and/or the Internet 430 (step 2).

In the second step, assuming that the problem has been determined to lie with the ISP network 420 or the Internet 430 (and not with the customer network 410), the application might run tests from the user device at test point a 405 to the Internet drain at test point c 425 ("a to c test"), and from the user device at test point a 405 to the website at test point d 435 ("end-to-end test"). Comparison of the a to c test results and the end-to-end test results might identify whether the fault is located at the ISP access network 420 and/or at the Internet 430. For example, a difference between the results of the end-to-end test and the a to c test might indicate a problem with the Internet 430. An additional comparison between test results of the a to b segment (from the first step) and the results of the a to c test (from the second step) might be implemented to determine whether a fault may be located (or also located) in the ISP access network 420. For instance, if a difference is determined (that exceeds the acceptable threshold) as a result of this additional comparison, then it may be determined that a fault might lie with the ISP access network 420. Once the fault(s) is(are) identified and located, repairs may be initiated. After repairs are completed, the two-step test may be repeated to determine whether all faults have been identified, located, and repaired.

Similar to FIGS. 4B and 4C, FIGS. 4E and 4F show the two testing schemes that may be implemented during the second step. Turning back to the example of a customer having trouble loading a webpage of a website located at test point d 435, FIG. 4E shows an OAM testing scheme, in which an end-to-end test 450 (i.e., a to d segment) is tested concurrently with a control group test 455 (i.e., a to c segment, in this example). FIG. 4F shows a throughput or capacity testing scheme, in which the end-to-end test 450 is staggered with a control group test 455a. To improve accuracy, a second control group test 455b may be implemented. In this case, the first control group test 455a (of the a to c segment, in this example) precedes the end-to-end test 450, which is followed by the second control group test 455b (also of the a to c segment, in this example).

Figure 5:
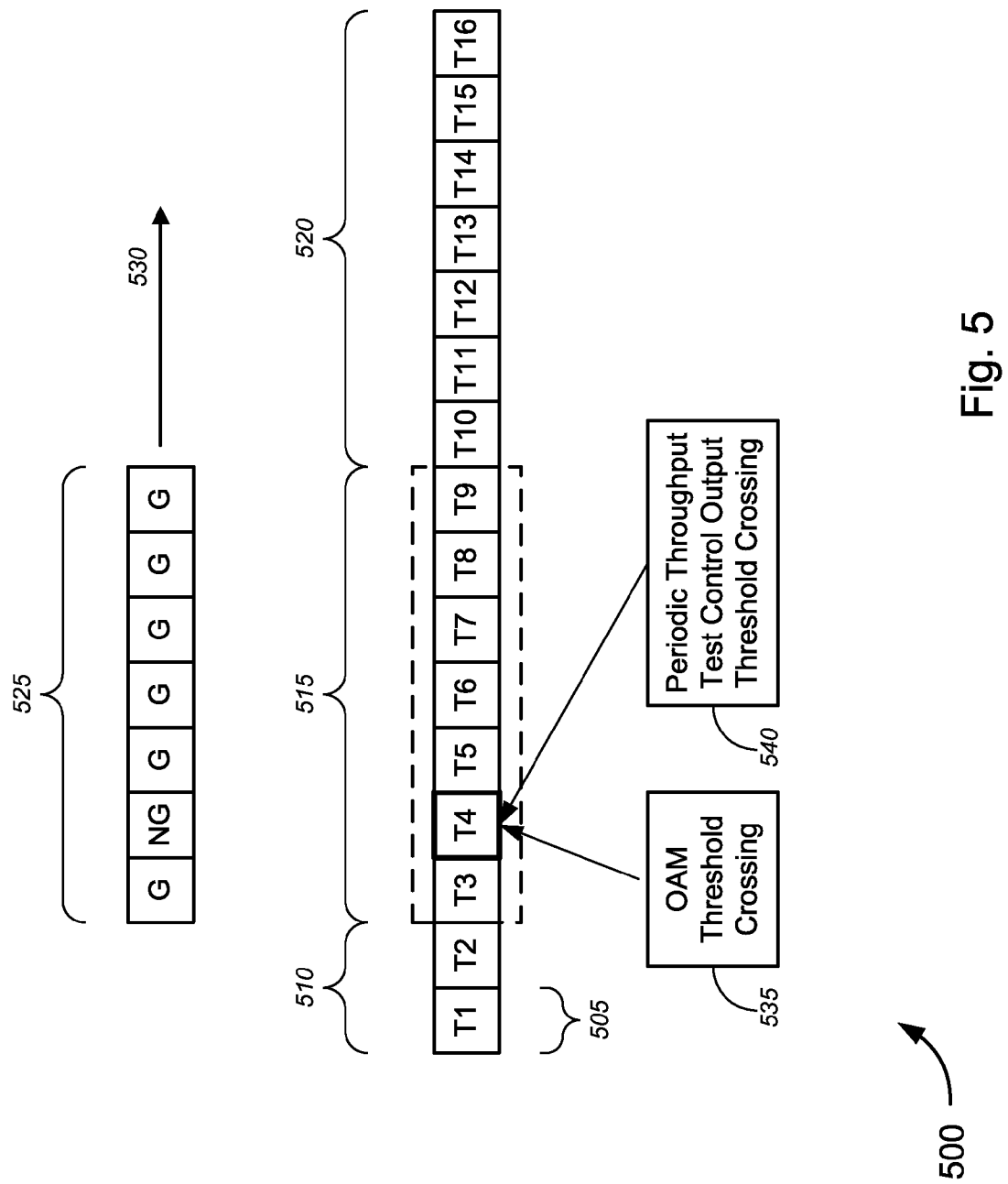
FIG. 5 is a general schematic diagram illustrating a method for testing performance of a network connection using sliding window observation, in accordance with various embodiments.

FIG. 5 is a general schematic diagram illustrating a method 500 for testing performance of a network connection using a sliding window observation method used to establish that the control path is performing in a stable manner, in accordance with various embodiments. In FIG. 5, method 500 might comprise one or more frames 505 being transmitted from a first test point (e.g., one of a test point including, but not limited to, test point 270 in FIGS. 2 and 3, or test point a, b, c, or d in FIG. 4) to a second test point (e.g., another of a test point including, but not limited to, test point 270 in FIGS. 2 and 3, or test point a, b, c, or d in FIG. 4). With the use of sliding window observation, a window 515 having a predetermined number of frames (seven frames, in the example of FIG. 5) may be transmitted at a time from the first test point to the second test point. Although window 515 has seven frames as shown in FIG. 5, any suitable number of frames may be transmitted in a window 515. As a first frame of the window 515 is tested using a validity test, which is indicative of either a "good" ("G") path or a "bad" ("NG") path from the first test point to the second test point, receipt of that frame is acknowledged by the second test point and a result of the validity test is sent to an appropriate test server (which may be one of the first test point, the second test point, or another test point in the system). Upon receiving the frame receipt acknowledgement (and, in some cases, the validity test result 525 as well) for that frame, the first test point might indicate that frame as being transmitted 510. The second test point might indicate that frame as being acknowledged. The first test point might then transmit the next not yet transmitted frame 520 to the second test point. The process repeats along the direction indicated by arrow 530. Each frame 505 being tested for validity that exceeds or crosses a predetermined threshold might represent one or both of an OAM threshold crossing 535 or a periodic throughput test control output threshold crossing 540. In the manner described above, with the sliding window testing of the frames, stop-and-wait flow (and thus underutilization of bandwidth) can be avoided.

Turning to the example of FIG. 5, the sliding window observation may operate as described below. The one or more frames 505 might comprise frames T1 through T16, with frames T1 and T2 having been sent 510 by the first test point, acknowledgements having been received by the first test point, and test results 525 having been received by the first test point, the second test point, or an appropriate test point/test server. A window 515 of frames T3 through T9 has been sent to the second test point and each frame is being tested for validity. T3, being the first frame in sliding window 515, is currently being tested for validity. As the test result is returned 525, frame T3 might be determined to be valid, thus representing a good (or "G") path from the first test point to the second test point. Upon receipt of T3's acknowledgement and validity test result, the first test point might classify frame T3 as having been transmitted 510, and might transmit the next not yet transmitted frame 520 (in this case, frame T10), and thus the window 515 moves along the direction 530. Frame T4 is then tested for validity. In this example, T4 is determined to exceed or cross the thresholds of both the OAM test and the throughput test. As such, the result of the validity test for frame T4 might be denoted "NG," and T4 might represent a OAM threshold crossing 535 and a periodic throughput test control output threshold crossing 540. When at least one frame (in this case, T4) has been indicated as crossing one or both of the OAM threshold 535 or the periodic throughput test control output threshold, the system (such as system 100, 200, 300, or 400) might initiate repairs to the appropriate network connections (in this case, between the first and second test points). Alternatively, the system might, where possible or appropriate, redirect the frames through a different path, in a manner as described above with respect to FIG. 3.

Figure 6A:
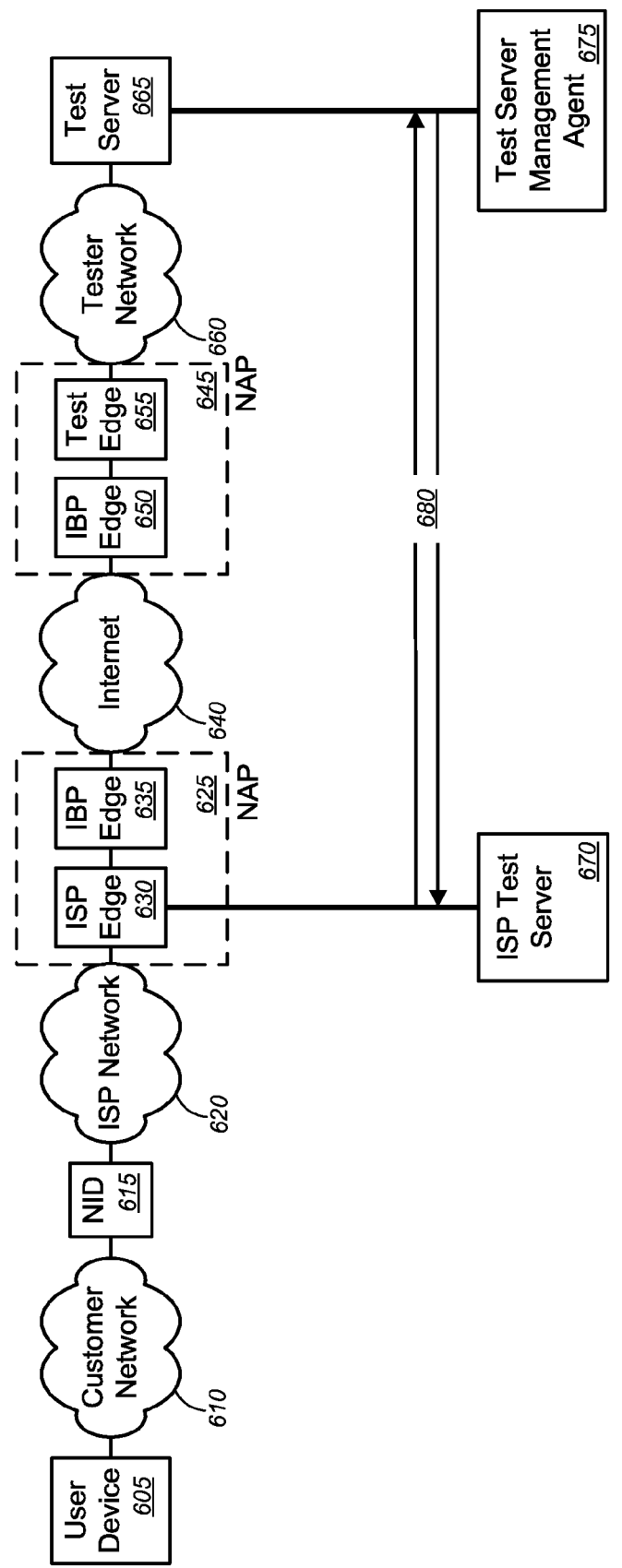
FIGS. 6A-6C are block diagrams illustrating various systems for testing performance of a network connection, in accordance with various embodiments.
Figure 6B:
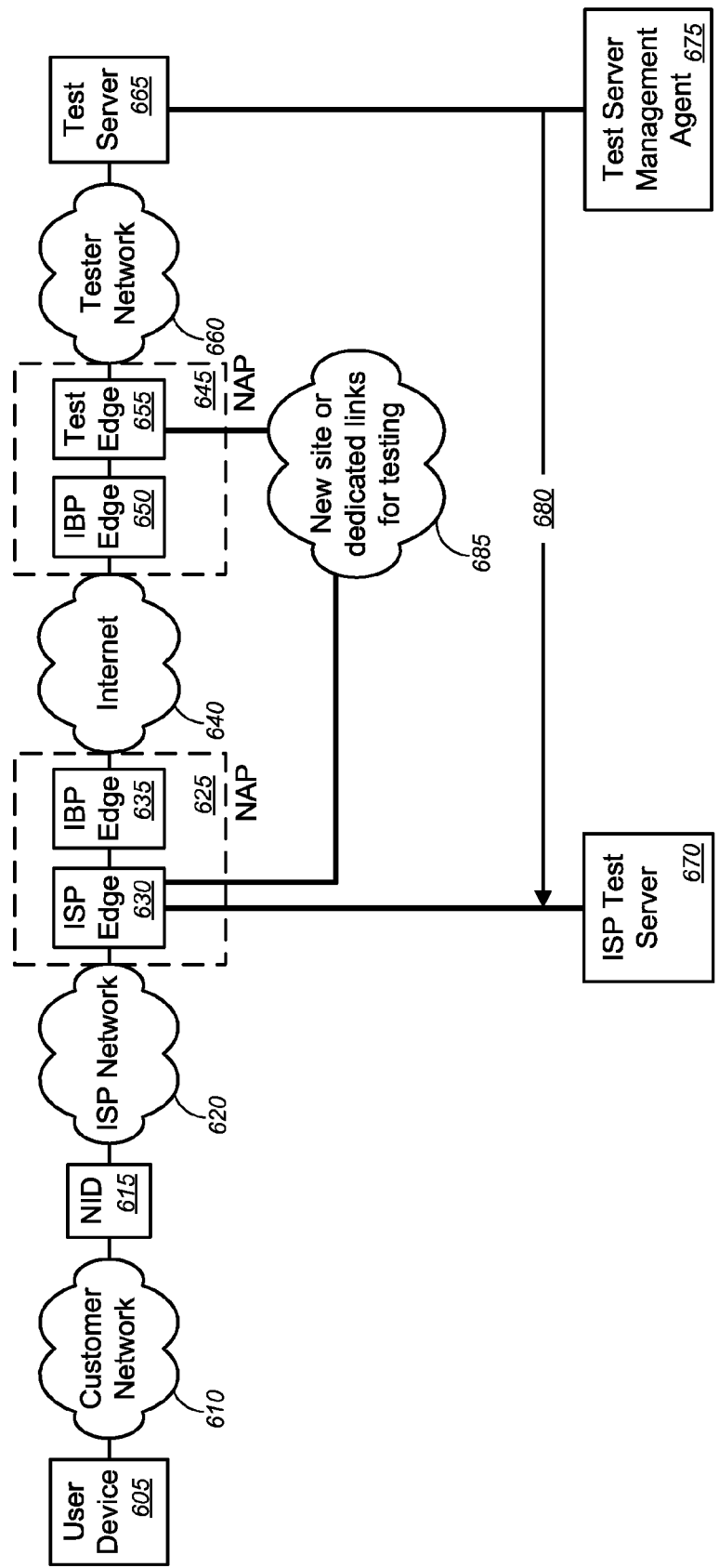
Figure 6C:
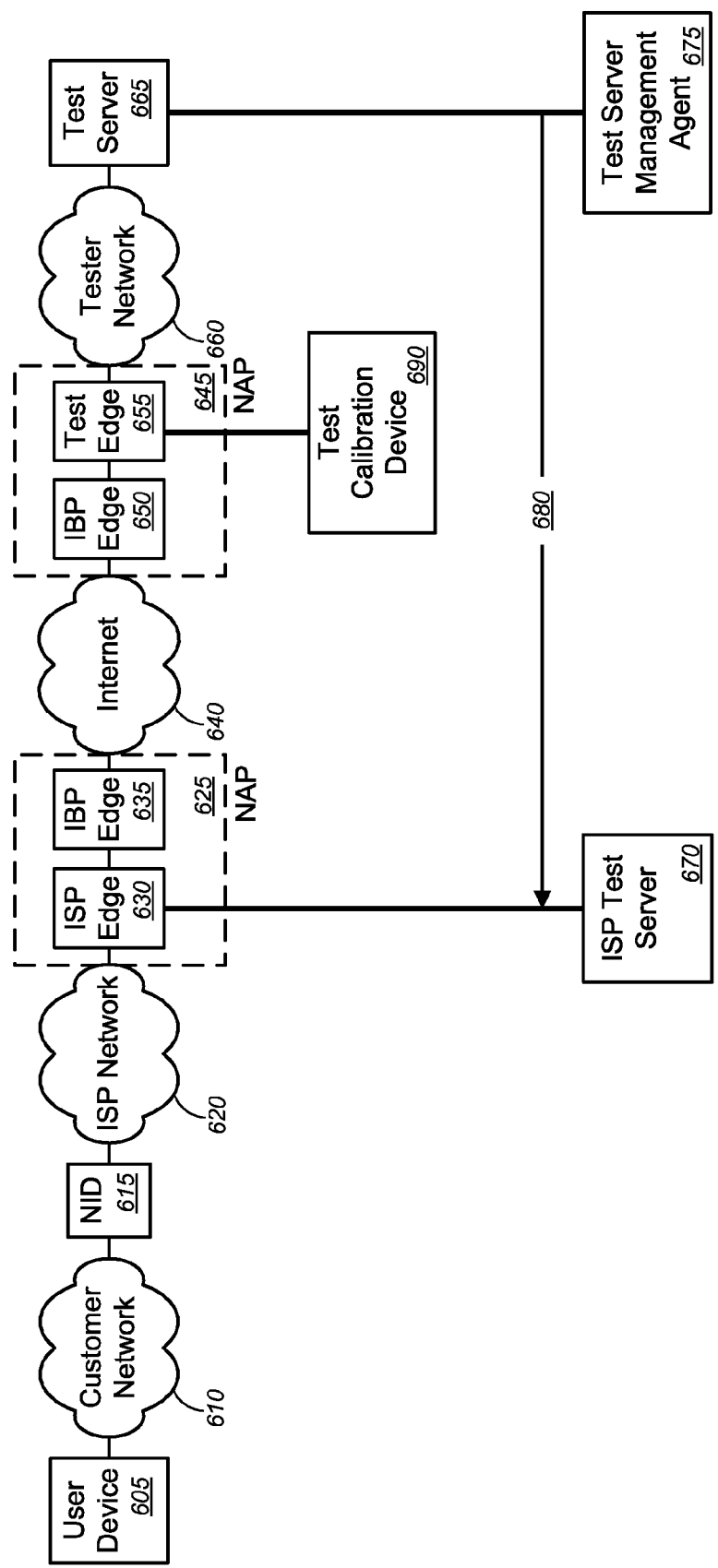

FIGS. 6A-6C (collectively, "FIG. 6") are block diagrams illustrating various systems 600 for testing performance of a network connection, in accordance with various embodiments. In FIG. 6, system 600 might comprise a user device 605, a customer network 610, a NID 615, an ISP network 620, a first NAP 625, Internet 640, a second NAP 645, a tester network 660, and/or a test server 665. The first NAP 625 might comprise an ISP edge router 630 communicatively coupled to an IBP edge router 635 via a peering point. The second NAP 645 might likewise comprise an IBP edge router 650 communicatively coupled to a test edge router 655 via another peering point. In some cases, test server 665 (and tester network 660) might be located "off-net." In alternative cases, test server 665 might be located within the Internet 640. The user device 605, the customer network 610, the NID 615, the ISP network 620, the first NAP 625, the ISP edge router 630, the IBP edge router 635, the Internet 640, the second NAP 645, the IBP edge router 650, the test edge router 655, the tester network 660, and/or the test server 665 might correspond to the user device 205, the customer network 210, the NID 215, the ISP network 220, the first NAP 225, the ISP edge router 230, the IBP edge router 235, the Internet 240, the second NAP 245, the IBP edge router 250, the test edge router 255, the tester network 260, and/or the test server 265, respectively, as shown and described in detail above with respect to FIGS. 2 and 3.

Testing as an industry standard recognizes that everything that is involved in a path is part of the performance test, therefore, a "true" standard test might typically be conducted at the ends of the segment of interest. In the "off-net" case, other components in the path might contribute to test results that are more than what is in the ISP network. To segment performance down to the ISP network, more information is needed.

With reference to FIG. 6A, system 600 might further comprise an ISP test server 670 communicatively coupled to ISP edge router 630. Test server management agent 675 of test server 665 might be configured to establish a two-way diagnostic control test path 680 with the ISP test server 670. In other words, in order to ensure that the "off-net" path does not impact the test, standard trouble-shooting practices might be used to check the off-net path's performance (e.g., using an OAM test) and capacity (e.g., using a throughput or capacity test) from the ISP test server 670 to the test server management agent 675 of the off-net test server 665 for transparency, and from the test server management agent 675 of the off-net test server 665 to the ISP test server 670 to qualify that the end-to-end performance is attributable to the ISP network 620 performance, rather than being attributable to other parts of the Internet 640.

Beyond directly connected end-to-end measurement, this in-direct hybrid method helps segment performance, while ensuring valid test results. Implementation time for such a test, in some cases, might be estimated to range from 1 to 2 weeks. The cost would be minimal, as the hardware components would typically already be part of the system.

An alternative configuration is shown in FIG. 6B, in which system 600 further comprises a new site(s) or dedicated links for testing 685, which communicatively couples to ISP edge router 630 and test edge router 655, thereby paralleling the Internet 640 connections. In this manner, the test server 665 is made to look like it is "on-net" so that a "true" end-to-end performance metric may be obtained. Here, rather than a two-way diagnostic control test path 680, a one-way test path 680 is sufficient to establish a path from the test server management agent 675 of the off-net test server 665 to the ISP test server 670 to qualify that the end-to-end performance is attributable to the ISP network 620 performance, rather than being attributable to other parts of the Internet 640.

This configuration provides a clean dedicated link that more accurately meets testing standards. This configuration, however, is costly because of the added ports and additional specialized routing that are required, and the implementation time for such a test, in some cases, might be estimated to range from 30 to 60 days.

In yet another configuration, as shown in FIG. 6C, rather than the new site(s) or dedicated links for testing 685 of FIG. 6B, system 600 might further comprise a test calibration device 690 (which might include, but is not limited to, a Netgear® 3500L wireless network router/test calibration device, or the like).

Given that virtualization of test servers place test servers in an over-subscribed compute environment, and shifts the network and input/output ("I/O") cards' load from physical assets into an emulated central processing unit ("CPU") function that adds work load, virtualized test servers should be "validated" or "calibrated" to ensure that they are performing normally. In the example of FIG. 6C, the test calibration device 690 serves to "validate" or "calibrate" off-net test server 665 to ensure that it is performing normally.

Implementation time for such a test, in some cases, might be estimated to range from 1 to 2 weeks. The cost would be relatively minimal, as additional costs would include the cost of the test calibration device 690 itself (such as a Netgear® 3500L, or the like), rather than the added ports and additional specialized routing as discussed above with respect to FIG. 6B.

Some sampling considerations for the system 600 in FIGS. 6A-6C might include that the sampling period needs to be equal to or shorter than the semi-hourly user performance test. This is especially true during the peak hours when traffic conditions change rapidly. Continual two-way active measurement protocol ("TWAMP") or OAM based testing, along with periodic throughput testing to the ISP test server 670 in periods of 15 minutes or less might, in some instances, might provide sufficient granularity, provided that testing is conducted normally on a 2 hour test period. In such a case, at least 8 samples might be obtained per test window.

As an example, in the case that one is testing transmission of a 100 Mbs data stream from test server 665 to user device 605, then a 100 Mbs test should be periodically conducted from test server 665 (e.g., from test server management agent 675) to ISP test server 670 to ensure that the path through Internet 640 can accommodate a 100 Mbs flow.

Some long term considerations might be as follows. Given that the ISP servers and ISP modems are the common service path measurement points, they might be considered the best measurement points available. To ensure these tests are reasonable, external "off-net" tests may be conducted as "sanity" checks. Options (in order from least costly to most costly) might include, without limitation, using the standard approach of directly measuring using the ISP server as primary and the off-net test server as validation, or using the off-net test server, but creating both diagnostic controls and adding direct links where required, or the like.

Figure 7A:
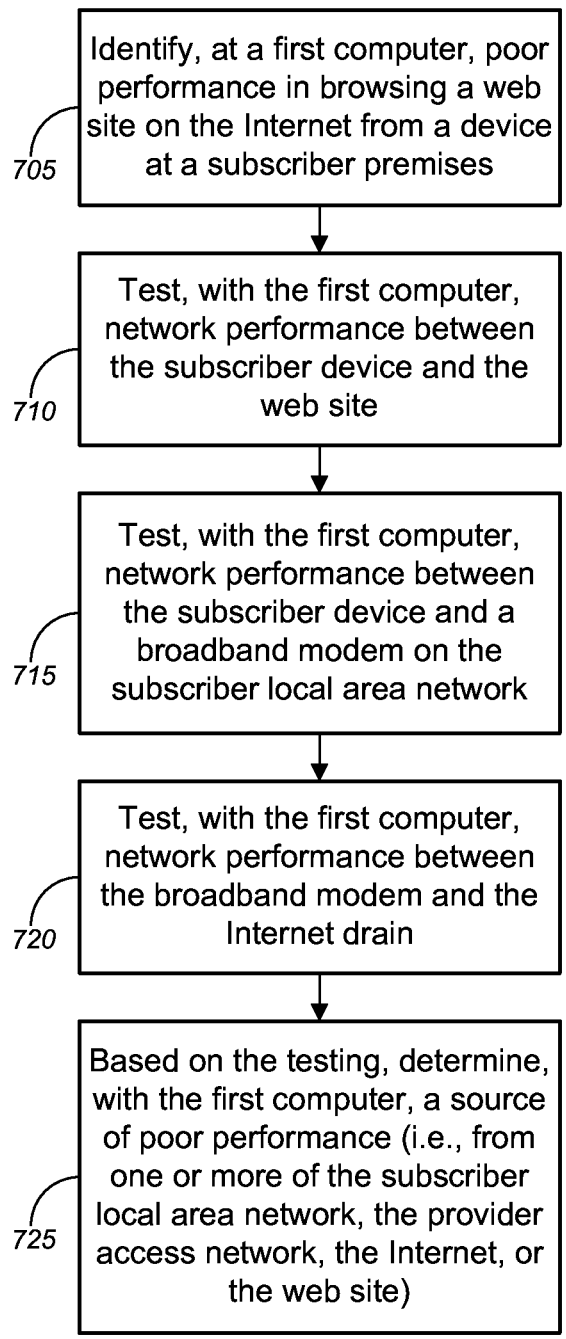
FIG. 7A is a flow diagram illustrating a method for testing performance of network connections for accessing a website, in accordance with various embodiments.
Figure 7B:
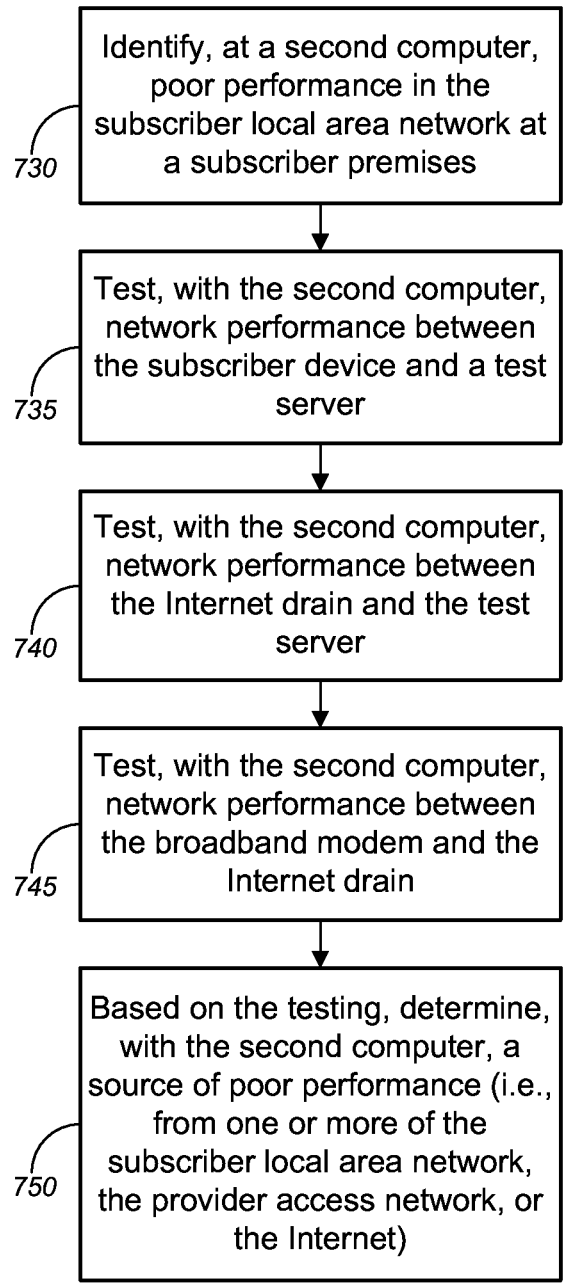
FIG. 7B is a flow diagram illustrating a method for testing performance of a customer network, in accordance with various embodiments.

FIGS. 7A and 7B (collectively, "FIG. 7") are flow diagrams illustrating methods for testing performance of network connections. In particular, FIG. 7A is a flow diagram illustrating a method 700 for testing performance of network connections for accessing a website, in accordance with various embodiments. FIG. 7B is a flow diagram illustrating a method 700 for testing performance of a customer network, in accordance with various embodiments.

In FIG. 7A, method 700 might comprise, at block 705, identifying, at a first computer, poor performance in browsing a website on the Internet from a device (e.g., user device 130 in FIG. 1 or test point a 405 in FIG. 4) at a subscriber premises (e.g., customer premises 110). In some examples, the customer might attempt to open a webpage of a website, by using an Internet browser on his or her user device. In failing to load the webpage, the application can identify that a problem exists and that performance is bad. Such identification, however, cannot, by itself, pinpoint the location of the fault.

The following processes serve to locate the fault. At block 710, method 700 might comprise testing, with the first computer, network performance between the subscriber device (e.g., user device 130 or test point a 405) and the website (e.g., test point d 435) [i.e., "end-to-end test"]. Method 700 might further comprise testing, with the first computer, network performance between the subscriber device (e.g., user device 130 or test point a 405) and a broadband modem (e.g., residential gateway ("RG") 120 in FIG. 1 or test point b 415 in FIG. 4) on the subscriber local area network (e.g., network 125 in FIG. 1 or network 410 in FIG. 4) [i.e., "a to b test"] (block 715). Method 700, at block 720, might comprise testing, with the first computer, network performance between the broadband modem (e.g., RG 120 or test point b 410) and the Internet drain (e.g., test point c 425 in FIG. 4) [i.e., "b to c test"].

At block 725, method 700 might comprise, based on the testing, determining, with the first computer, a source of poor performance (i.e., from one or more of the subscriber local area network, the provider access network, the Internet, or the website). For example, the end-to-end test (at block 710) serves to provide the overall performance, while the a to b test (at block 715) reflects the capacity and performance on the customer network (which could be a WiFi network), and the b to c test (at block 720) reflects the capacity and performance on the Internet service provider ("ISP") network. In some instances, the testing at blocks 715 and 720 might be combined (i.e., the first computer might test network performance between the subscriber device (e.g., user device 130 or test point a 405) and the Internet drain (e.g., test point c 425 in FIG. 4) [i.e., "a to c test"]). These tests combine to determine whether the problem is located at the customer network, the ISP network, or the Internet/website.

In some embodiments, in addition or alternative to the test of a website, a subscriber local area network may also be tested (or tracked) for performance. At block 730, for example, method 700 might comprise identifying, at a second computer, poor performance in the subscriber local area network at the subscriber premises. In some examples, a test server on a network (e.g., test server 265 in FIG. 2 or test point d 435 in FIG. 4) might occasionally or periodically ping a user device in the subscriber local area network at the subscriber premises. A slower response, or non-response (in some cases), might lead to an identification of the poor performance in the subscriber local area network.

The following processes serve to locate the fault. At block 735, method 700 might comprise testing, with the second computer, network performance between the subscriber device (e.g., user device 130 or test point a 405) and the test server (e.g., test server 265 or test point d 435) [i.e., "end-to-end test"]. Method 700 might further comprise testing, with the second computer, network performance the Internet drain (e.g., test point c 425 in FIG. 4) and the test server (e.g., test server 265 or test point d 435) [i.e., "c to d test"] (block 740). Method 700, at block 745, might comprise testing, with the second computer, network performance between the broadband modem (e.g., RG 120 or test point b 410) and the Internet drain (e.g., test point c 425) [i.e., "b to c test"].

At block 750, method 700 might comprise, based on the testing, determining, with the second computer, a source of poor performance (i.e., from one or more of the subscriber local area network, the provider access network, or the Internet). For example, the end-to-end test (at block 735) serves to provide the overall performance, while the c to d test (at block 740) reflects the capacity and performance of the Internet (or website therein), and the b to c test (at block 745) reflects the capacity and performance on the Internet service provider ("ISP") network. In some instances, the testing at blocks 740 and 745 might be combined (i.e., the second computer might test network performance between broadband modem (e.g., RG 120 or test point b 410) and the test server (e.g., test server 265 or test point d 435) [i.e., "b to d test"]). These tests combine to determine whether the problem is located at the customer network, the ISP network, or the Internet/website.

Two types of tests may be implemented for testing performance of network connections. A first test might be an operations, administration, and maintenance ("OAM") test, while a second test might be a throughput or capacity test, both tests of which are shown and described in detail above with respect to FIG. 4.

The first and second computers, in some cases, might be different computers, while they might, in other cases, be the same computer. Each of the first and second computers might be one of user or computing devices 130, 205, 605, server 140, 160, or 170, test server 140a, 160a, 170a, 265, 670, 675, or 690, test point 270, or network interface device ("NID") or access point 215 or 615, or the like. User or computing devices 130, 205, or 605 might be any suitable user device comprising, but not limited to, a tablet computer, a smart phone, a mobile phone, a portable gaming device, a gaming console, a digital video recording and playback device ("DVR"), a set-top or set-back box ("STB"), one or more television sets (including, for example, a high-definition ("HD") television, an Internet Protocol television ("IPTV"), and a cable television, or the like), a desktop computer, or a laptop computer.

Figure 8:
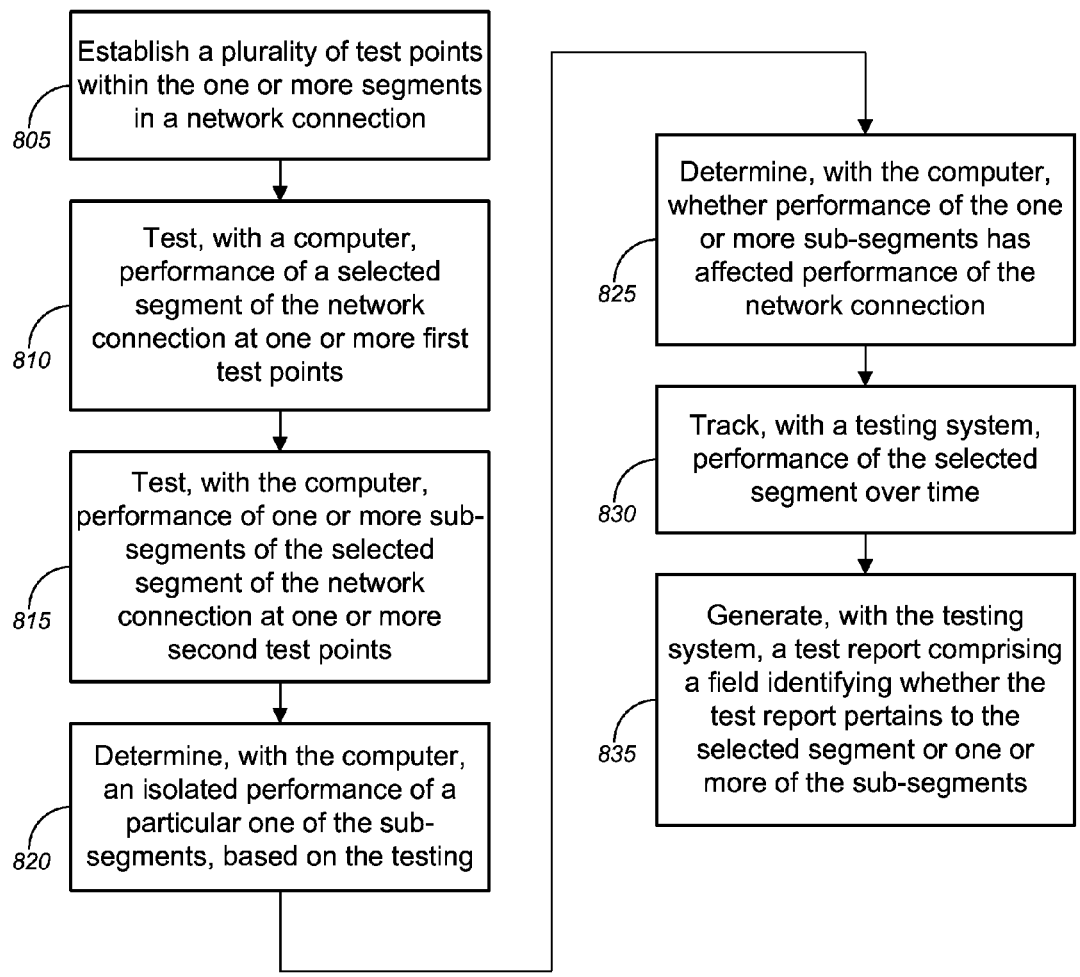
FIG. 8 is a flow diagram illustrating a method for testing performance of a network connection, in accordance with various embodiments.

FIG. 8 is a flow diagram illustrating a method 800 for testing performance of a network connection, in accordance with various embodiments. Method 800 might comprise establishing, at block 805, a plurality of test points (e.g., test point 270, 405, 415, 425, or 435, etc.) within one or more segments in a network connection. At block 810, method 800 might comprise testing, with a computer, performance of a selected segment of the network connection at one or more first test points. Method 800 might further comprise, at block 815, testing, with the computer, performance of one or more sub-segments of the selected segment of the network connection at one or more second test points. Method 800, at block 820, might comprise determining, with the computer, an isolated performance of a particular one of the sub-segments, based on the testing.

At block 825, method 800 might comprise determining, with the computer, whether performance of the one or more sub-segments has affected performance of the network connection. If so determined, appropriate maintenance of repairs may be implemented (as described above). Method 800 might further comprise tracking, with a testing system, performance of the selected segment over time (block 830), and generating, with the testing system, a test report comprising a field identifying whether the test report pertains to the selected segment or one or more of the sub-segments (block 835).

In some embodiments, testing performance of the selected segment and the one or more sub-segments might comprise receiving, at the computer, test data from the one or more first test points and the one or more second test points. In some cases, the one or more first test points and the one or more second test points might each comprise at least one test point in common. In some instances, the computer might be a first computer, where at least one of the test points is a second computer executing a testing application. At least one of the test points, in some embodiments, might each include, without limitation, one of a dedicated testing device or a routing element in the network connection. The computer, in some examples, might be one of the test points.

In some instances, testing performance of the selected segment might comprise testing performance of the segment on a first interval, while testing performance of the one or more sub-segments might comprise testing performance of the one or more sub-segments on a second interval. The first interval may, in some examples, be at least eight times the second interval. Testing performance of the selected segment, in some cases, might comprise operations, administration, and maintenance ("OAM") testing, in which case testing the selected segment and testing the one or more sub-segments may (in some instances) be performed simultaneously (e.g., as shown and described above with respect to FIGS. 4B and 4E). Testing performance of the selected segment might alternatively or additionally comprise throughput testing or capacity testing, in which case testing the selected segment and testing the one or more sub-segments may (in some instances) be performed sequentially (e.g., as shown and described above with respect to FIGS. 4C and 4F).

In some embodiments, the particular one of the sub-segments might include a connection between a subscriber premises and an Internet service provider edge router. In some instances, a second of the one or more sub-segments might comprise a connection between the Internet service provider edge router and a third party server. In some cases, the particular one of the sub-segments does not include the first endpoint or the second endpoint.

According to some embodiments, the test or selected segment might comprise a connection between a subscriber device and a test server on the Internet. The test or selected segment might comprise a plurality of sub-segments including, but not limited to, a first sub-segment from a subscriber device to a provider access device, a second sub-segment from the provider access device to a provider Internet drain, and a third sub-segment from the provider Internet drain to the test server on the Internet. The provider access device may, in some cases, include a broadband modem at a subscriber premises. In some cases, testing one or more sub-segments might comprise testing a consolidated sub-segment comprising the second and third sub-segments. In such cases, method 800 might further comprise determining that performance of the first sub-segment has affected performance of the network connection, based on tests of the test segment and tests of the consolidated sub-segments.

In some instances, the computer might be one of the first or second computer described above with respect to FIG. 7. In other cases, the computer in method 800 might be any suitable computing device or system including, without limitation, user or computing devices 130, 205, 605, server 140, 160, or 170, test server 140a, 160a, 170a, 265, 670, 675, or 690, test point 270, or network interface device ("NID") or access point 215 or 615, or the like. User or computing devices 130, 205, or 605 might be any suitable user device comprising, but not limited to, a tablet computer, a smart phone, a mobile phone, a portable gaming device, a gaming console, a DVR, an STB, an HDTV, an IPTV, a cable television, a desktop computer, or a laptop computer.

The plurality of test points and the one or more segments discussed above with respect to FIG. 8 are intended to be any suitable test points and segments located anywhere between the subscriber device at the subscriber local area network to some suitable test point in the Internet or a test point that is "off-net." In other words, the plurality of test points and the one or more segments need not be limited to the specific examples as shown and described with respect to FIGS. 1-6.

Figure 9:
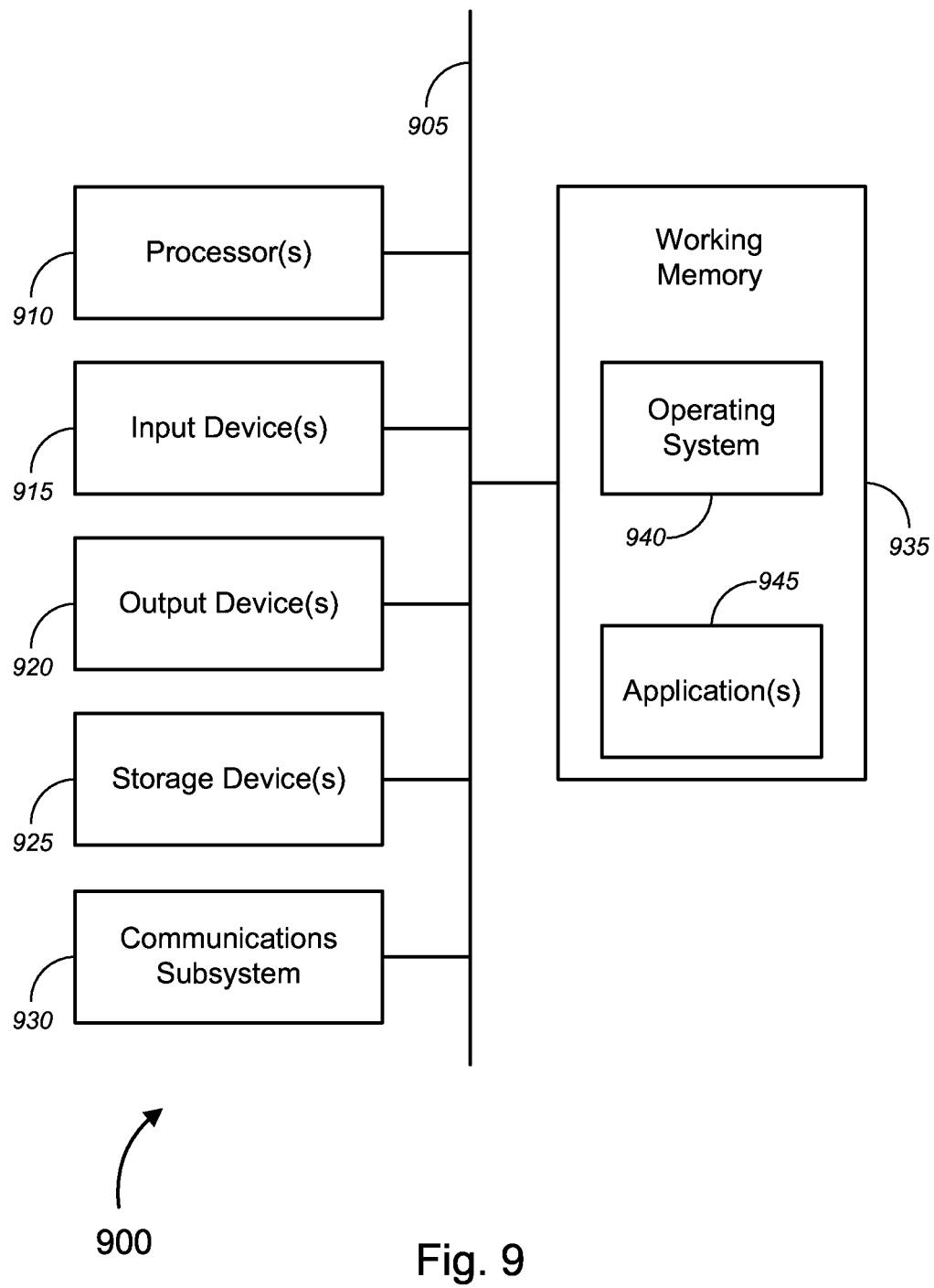
FIG. 9 is a block diagram illustrating an exemplary computer or system hardware architecture, in accordance with various embodiments.

We now turn to FIG. 9, which is a block diagram illustrating an exemplary computer architecture. FIG. 9 provides a schematic illustration of one embodiment of a computer system 900 that can perform the methods provided by various other embodiments, as described herein, and/or can perform the functions of local or user computer system 130, 205, or 605, remote computer system 140, 160, or 170, test servers or test points 140a, 160a, 170a, 265, 270, 665, 670, 675, or 690, or other computer systems as described above. It should be noted that FIG. 9 is meant only to provide a generalized illustration of various components, of which one or more, or none, of each may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors, or one or more special-purpose processors such as digital signal processing chips, graphics acceleration processors, or the like; one or more input devices 915, which can include without limitation a mouse, a keyboard, or the like; and one or more output devices 920, which can include without limitation a display device, a printer, or the like.

The computer system 900 may further include, or be in communication with, one or more storage devices 925. The one or more storage devices 925 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 900 might also include a communications subsystem 930, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 930 may permit data to be exchanged with a network (such as network 125, 145, 155, 165, 210, 220, 240, 260, 410, 420, 430, 610, 620, 640, 660, or 685, to name examples), with other computer systems, with any other devices described herein, or with any combination of network, systems, and devices. According to some embodiments, network 125 (as well as network 145, 155, 165, 210, 220, 240, 260, 410, 420, 430, 610, 620, 640, 660, or 685) might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 900 will further comprise a working memory 935, which can include a RAM or ROM device, as described above.

The computer system 900 may also comprise software elements, shown as being currently located within the working memory 935, including an operating system 940, device drivers, executable libraries, or other code. The software elements may include one or more application programs 945, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 925 described above. In some cases, the storage medium might be incorporated within a computer system, such as the system 900. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 900, or might take the form of source or installable code. The source or installable code, upon compilation, installation, or both compilation and installation, on the computer system 900 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 900, to perform methods in accordance with various embodiments of the invention. According to a set of embodiments, some or all of the procedures of such methods might be performed by the computer system 900 in response to processor 910 executing one or more sequences of one or more instructions. The one or more instructions might be incorporated into the operating system 940 or other code that may be contained in the working memory 935, such as an application program 945. Such instructions may be read into the working memory 935 from another computer readable medium, such as one or more of the storage devices 925. Merely by way of example, execution of the sequences of instructions contained in the working memory 935 might cause the one or more processors 910 to perform one or more procedures of the methods described herein.

The terms "machine readable medium" and "computer readable medium," as used herein, refer to any medium that participates in providing data that causes a machine to operate in a specific fashion. In an embodiment implemented using the computer system 900, various computer readable media might be involved in providing instructions or code to the one or more processors 910 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 925. Volatile media includes, without limitation, dynamic memory, such as the working memory 935. Transmission media includes, without limitation, coaxial cables, copper wire and fiber optics, including the wires that comprise the bus 905, as well as the various components of the communication subsystem 930, or the media by which the communications subsystem 930 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Figure 10:
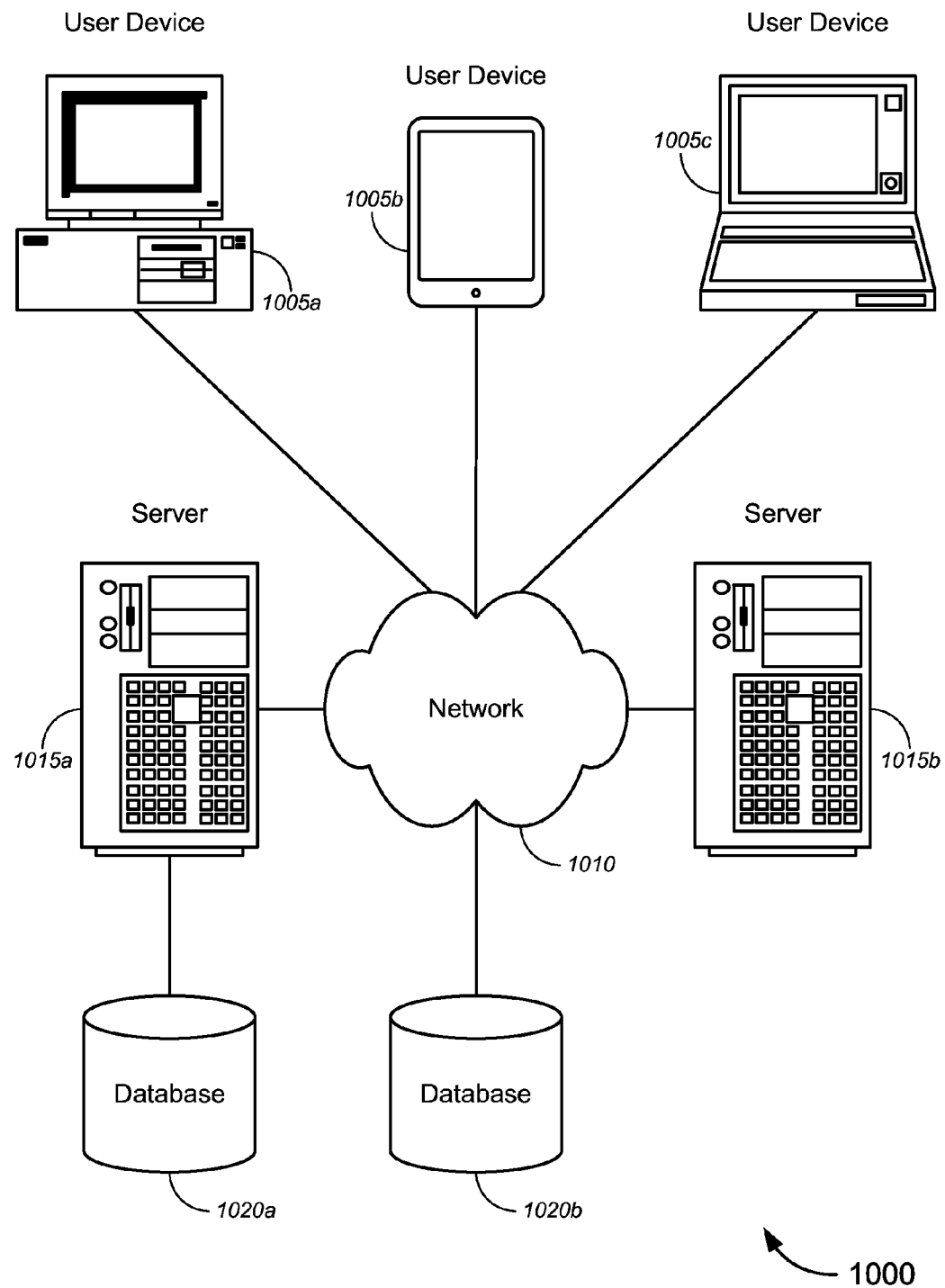
FIG. 10 is a block diagram illustrating a networked system of computers, which can be used in accordance with various embodiments.

As noted above, a set of embodiments comprises methods and systems for testing performance of network components. FIG. 10 illustrates a schematic diagram of a system 1000 that can be used in accordance with one set of embodiments. The system 1000 can include one or more user computers or user devices 1005. A user computer or user device 1005 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer or user device 1005 can also have any of a variety of applications, including one or more applications configured to perform methods provided by various embodiments (as described above, for example), as well as one or more office applications, database client and/or server applications, and/or web browser applications. Alternatively, a user computer or user device 1005 can be any other electronic device, such as a thin-client computer, Internet-enabled mobile telephone, and/or personal digital assistant, capable of communicating via a network (e.g., the network 1010 described below) and/or of displaying and navigating web pages or other types of electronic documents. Although the exemplary system 1000 is shown with three user computers or user devices 1005, any number of user computers or user devices can be supported.

Certain embodiments operate in a networked environment, which can include a network 1010. The network 1010 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 1010 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1015. Each of the server computers 1015 may be configured with an operating system, including without limitation any of those discussed above, as well as any commercially (or freely) available server operating systems. Each of the servers 1015 may also be running one or more applications, which can be configured to provide services to one or more clients 1005 and/or other servers 1015.

Merely by way of example, one of the servers 1015 might be a data server, as described above. The data server might include (or be in communication with) a web server, which can be used, merely by way of example, to process requests for web pages or other electronic documents from user computers 1005. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1005 to perform methods of the invention.

The server computers 1015, in some embodiments, might include one or more application servers, which can be configured with one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer or user device 1005 and/or another server 1015. In some embodiments, an application server can perform one or more of the processes for implementing automated cloud expansion and ordering, or the like, as described in detail above. Data provided by an application server may be formatted as one or more web pages (comprising HTML, JavaScript, etc., for example) and/or may be forwarded to a user computer 1005 via a web server (as described above, for example). Similarly, a web server might receive web page requests and/or input data from a user computer 1005 and/or forward the web page requests and/or input data to an application server. In some cases a web server may be integrated with an application server.

In accordance with further embodiments, one or more servers 1015 can function as a file server and/or can include one or more of the files (e.g., application code, data files, etc.) necessary to implement various disclosed methods, incorporated by an application running on a user computer 1005 and/or another server 1015. Alternatively, as those skilled in the art will appreciate, a file server can include all necessary files, allowing such an application to be invoked remotely by a user computer or user device 1005 and/or server 1015.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020. The location of the database(s) 1020 is discretionary: merely by way of example, a database 1020a might reside on a storage medium local to (and/or resident in) a server 1015a (and/or a user computer or user device 1005). Alternatively, a database 1020b can be remote from any or all of the computers 1005, 1015, so long as it can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, the database 1020 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for testing performance of a network connection, the method comprising: identifying, at a computer, poor performance in browsing a web site on the Internet from a subscriber device at a subscriber premises, the subscriber premises comprising a subscriber local area network that provides communication between the subscriber device and a provider access network, the provider access network providing access, through an Internet drain, to the Internet; testing, with the computer, end-to-end network performance, by testing network performance between the subscriber device and the web site; testing, with the computer, a first segment network performance, by testing network performance between the subscriber device and a broadband modem on the subscriber local area network; testing, with the computer, a second segment network performance, by testing network performance between the broadband modem and the Internet drain; inferring, with the computer, a third segment network performance, by inferring network performance between the Internet drain and the web site, based on the tested end-to-end network performance, the tested first segment network performance, and the tested second segment network performance; and based on the testing of the end-to-end network performance, the first segment network performance, and the second segment network performance, and based on the inferring of the third segment network performance, wherein the third sub-segment network performance is not directly tested, determining, with the computer, a source of the poor performance, the source of the poor performance being one or more of the subscriber local area network, the provider access network, the Internet, or the web site.

2. The method of claim 1, wherein the subscriber device is the computer.

3. The method of claim 1, wherein the computer is a provider computer in the provider network, in communication with a provider application on the subscriber device.

4. A method for testing performance of a network connection comprising one or more segments, the method comprising: establishing a plurality of test points within the one or more segments; testing, with a computer, end-to-end network performance, by testing network performance of a selected segment of the network connection at two first test points, the selected segment having a first endpoint and a second endpoint, one first test point located at the first endpoint and the other first test point located at the second endpoint; testing, with the computer, network performance of one or more sub-segments of the selected segment of the network connection at one or more second test points, by testing a first sub-segment network performance of one of the one or more sub-segments between one of the first test points and one of the one or more second test points, and by testing one or more second sub-segment network performance of at least one sub-segment of the one or more sub-segments that are between two second test points of the two or more second test points; inferring, with the computer, a third sub-segment network performance of one other of the one or more sub-segments between the other of the first test points and one other of the one or more second test points, based on the tested end-to-end network performance, the tested first sub-segment network performance, and the tested one or more second sub-segment network performance, wherein the third sub-segment network performance is not directly tested; and determining, with the computer, an isolated performance of a particular one of the sub-segments, based on the testing of the end-to-end network performance, the first sub-segment network performance, and the one or more second sub-segment network performance, and based on the inferring of the third sub-segment network performance.

5. The method of claim 4, further comprising: determining, with the computer, whether performance of the one or more sub-segments has affected performance of the network connection.

6. The method of claim 4, wherein testing performance of the selected segment and the one or more sub-segments comprises receiving, at the computer, test data from the one or more first test points and the one or more second test points.

7. The method of claim 4, wherein the one or more first test points and the one or more second test points each comprise at least one test point in common.

8. The method of claim 4, wherein the computer is a first computer and wherein at least one of the test points is a second computer executing a testing application.

9. The method of claim 4, wherein at least one of the test points is a dedicated testing device.

10. The method of claim 4, wherein at least one of the test points is a routing element in the network connection.

11. The method of claim 4, wherein the computer is one of the test points.

12. The method of claim 4, wherein the selected segment comprises a connection between a subscriber device and a test server on the Internet, and wherein the selected segment comprises a plurality of sub-segments, wherein: the first sub-segment is a sub-segment from a subscriber device to a provide access device; the one or more second sub-segments are a-sub-segments from the provider access device to a provider Internet drain; and the third sub-segment is a sub-segment from the provider Internet drain to the test server on the Internet.

13. The method of claim 12, wherein testing one or more sub-segments comprises testing a consolidated sub-segment comprising the second and third sub-segments, the method further comprising determining whether performance of the first sub-segment has affected performance of the network connection, based at least in part on testing of the selected segment and testing of the consolidated sub-segment.

14. The method of claim 12, wherein the provider access device is a broadband modem at a subscriber premises.

15. The method of claim 4, wherein: testing performance of the selected segment comprises testing performance of the segment on a first interval; and testing performance of the one or more sub-segments comprises testing performance of the one or more sub-segments on a second interval.

16. The method of claim 15, wherein the first interval is at least eight times the second interval.

17. The method of claim 4, wherein the particular one of the sub-segments is a connection between a subscriber premises and an Internet service provider edge router.

18. The method of claim 4, wherein a second of the one or more sub-segments comprises a connection between the Internet service provider edge router and a third party server.

19. The method of claim 4, further comprising: tracking, with a testing system, performance of the selected segment over time.

20. The method of claim 4, further comprising: generating, with the testing system, a test report comprising a field identifying whether the test report pertains to the selected segment or one or more of the sub-segments.

21. The method of claim 4, wherein testing performance of the selected segment comprises operations, administration, and maintenance ("OAM") testing.

22. The method of claim 21, wherein testing the selected segment and testing the one or more sub-segments are performed simultaneously.

23. The method of claim 4, wherein testing performance of the selected segment comprises throughput testing or capacity testing.

24. The method of claim 23, wherein testing the selected segment and testing the one or more sub-segments are performed sequentially.

25. The method of claim 4, wherein the particular one of the sub-segments does not include the first endpoint or the second endpoint.

26. An apparatus, comprising: a non-transitory computer readable medium having encoded thereon a set of instructions that, when executed by one or more computers, causes the apparatus to perform one or more operations for testing performance of a selected segment of network connection comprising a plurality of segments and having a plurality of test points within the one or more segments, the set of instructions comprising: instructions to test end-to-end network performance, by testing network performance of a selected segment of the network connection at two first test points, the selected segment having a first endpoint and a second endpoint, one first test point located at the first endpoint and the other first test point located at the second endpoint; instructions to test network performance of one or more sub-segments of the selected segment of the network connection at one or more second test points, by testing a first sub-segment network performance of one of the one or more sub-segments between one of the first test points and one of the one or more second test points, and by testing one or more second sub-segment network performance of at least one sub-segment of the one or more sub-segments that are between two second test points of the two or more second test points; instructions for inferring a third sub-segment network performance of one other of the one or more sub-segments between the other of the first test points and one other of the one or more second test points, based on the tested end-to-end network performance, the tested first sub-segment network performance, and the tested one or more second sub-segment network performance, wherein the third sub-segment network performance is not directly tested; and instructions to determine an isolated performance of a particular one of the sub-segments, based on the testing of the end-to-end network performance, the first sub-segment network performance, and the one or more second sub-segment network performance, and based on the inferring of the third sub-segment network performance.

27. A computer system, comprising: one or more processors; and a non-transitory computer readable medium in communication with the one or more processors, the computer readable medium having encoded thereon a set of instructions that, when executed by the one or more processors, causes the computer system to perform one or more operations for testing performance of a selected segment of network connection comprising a plurality of segments and having a plurality of test points within the one or more segments, the set of instructions comprising: instructions to test end-to-end network performance, by testing network performance of a selected segment of the network connection at two first test points, the selected segment having a first endpoint and a second endpoint, one first test point located at the first endpoint and the other first test point located at the second endpoint; instructions to test network performance of one or more sub-segments of the selected segment of the network connection at one or more second test points, by testing a first sub-segment network performance of one of the one or more sub-segments between one of the first test points and one of the one or more second test points, and by testing one or more second sub-segment network performance of at least one sub-segment of the one or more sub-segments that are between two second test points of the two or more second test points; instructions for inferring a third sub-segment network performance of one other of the one or more sub-segments between the other of the first test points and one other of the one or more second test points, based on the tested end-to-end network performance, the tested first sub-segment network performance, and the tested one or more second sub-segment network performance, wherein the third sub-segment network performance is not directly tested; and instructions to determine an isolated performance of a particular one of the sub-segments, based on the testing of the end-to-end network performance, the first sub-segment network performance, and the one or more second sub-segment network performance, and based on the inferring of the third sub-segment network performance.

* * * * *